United States Patent
Kezys et al.

(10) Patent No.: US 12,267,201 B1
(45) Date of Patent: Apr. 1, 2025

(54) SYSTEMS AND METHODS FOR ESTIMATING SYMBOL TIMING IN RECEIVED DATA FRAMES

(71) Applicant: HaiLa Technologies Inc., Montreal (CA)

(72) Inventors: Vytas Kezys, Ancaster (CA); Alexander Neil Birkett, Dundas (CA); Kerwin Johnson, Ottawa (CA); Sam Tiller, Ottawa (CA); Juan Miguel David Becerra, Montreal (CA)

(73) Assignee: HaiLa Technologies Inc., Montreal (CA)

( * ) Notice: Subject to any disclaimer, the term of this patent is extended or adjusted under 35 U.S.C. 154(b) by 0 days.

(21) Appl. No.: 18/964,068

(22) Filed: Nov. 29, 2024

Related U.S. Application Data

(60) Provisional application No. 63/707,520, filed on Oct. 15, 2024.

(51) Int. Cl.
*H04L 27/26* (2006.01)

(52) U.S. Cl.
CPC .... *H04L 27/2662* (2013.01); *H04L 27/26526* (2021.01); *H04L 27/2672* (2013.01); *H04L 27/2675* (2013.01)

(58) Field of Classification Search
CPC ........... H04L 27/2662; H04L 27/26526; H04L 27/2672; H04L 27/2675
See application file for complete search history.

(56) References Cited

U.S. PATENT DOCUMENTS

| | | | |
|---|---|---|---|
| 5,914,981 A * | 6/1999 | Veintimilla | H04L 27/2613 375/E1.001 |
| 6,058,145 A * | 5/2000 | Komaki | H04L 27/2676 375/316 |
| 10,338,205 B2 | 7/2019 | Zhang | |
| 11,483,836 B2 | 10/2022 | Zhang | |
| 11,664,681 B2 | 5/2023 | Fan | |
| 11,962,412 B1 | 4/2024 | Kezys | |
| 2022/0303929 A1 | 9/2022 | Chowdhury | |
| 2023/0244883 A1 | 8/2023 | Nielsen | |
| 2024/0113855 A1 * | 4/2024 | Stadlmair | H04L 7/0037 |

FOREIGN PATENT DOCUMENTS

| | | | | |
|---|---|---|---|---|
| EP | 822691 A2 * | 2/1998 | | H04L 27/2662 |
| WO | WO-2004021363 A1 * | 3/2004 | | G11C 27/02 |

* cited by examiner

*Primary Examiner* — Freshteh N Aghdam
(74) *Attorney, Agent, or Firm* — SMART & BIGGAR LP; Isis E. Caulder; Sunil R. Rao

(57) ABSTRACT

There is provided a method and a circuit for estimating symbol timing in one or more received data frames of a nominal constant envelope signal. The circuit may include an envelope detector and a symbol timing estimator. The envelope detector may be configured to generate an envelope detection output for the received data frames, the envelope detection output having an amplitude ripple associated with the symbol timing in the received data frames. The symbol timing estimator may be configured to receive the envelope detection output and generate a symbol timing estimation output based on the amplitude ripple.

27 Claims, 22 Drawing Sheets

SYSTEMS AND METHODS FOR ESTIMATING SYMBOL TIMING IN RECEIVED DATA FRAMES

FIELD

The present subject-matter relates to systems and methods for estimating symbol timing in received data frames, and more particularly to systems and methods for estimating symbol timing in received data frames of a nominal constant envelope signal.

BACKGROUND

Wireless communication includes transmitting and receiving data using radio frequency (RF) signals. A transmitter generates a data frame for transmission by assigning data to a block of modulation symbols. A symbol refers to any suitable representation of information. For example, in some applications, a symbol may correspond to a single bit. In some applications, a symbol may correspond to a sequence of chips. Any suitable modulation scheme may be used to assign the data to the modulation symbols. Some non-limiting examples of the modulation scheme include phase shift keying (PSK) and frequency shift keying (FSK).

Symbol timing estimation may generally refer to estimation of a symbol frequency and/or a symbol phase within the data frame. For example, symbol timing estimation may include detecting the start time and the duration of the symbol. Symbol timing estimation may be needed in many communication applications. For example, a receiver may use symbol timing estimation to demodulate a received signal and recover the transmitted data. As another example, a backscattering tag may use symbol timing estimation to assist in generating a backscattered signal containing encoded backscattering tag data.

SUMMARY OF THE VARIOUS EMBODIMENTS

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In one broad aspect, there is provided a circuit for estimating symbol timing in one or more received data frames of a nominal constant envelope signal. The circuit may include an envelope detector and a symbol timing estimator. The envelope detector may be configured to generate an envelope detection output for the received data frames, the envelope detection output having an amplitude ripple associated with the symbol timing in the received data frames. The symbol timing estimator may be configured to receive the envelope detection output and generate a symbol timing estimation output based on the amplitude ripple.

In some embodiments, the circuit may be included in a backscattering tag configured to: generate a clock signal based on the symbol timing estimation output; and use the clock signal during backscattering of the received data frames.

In some embodiments, the backscattering tag may be configured to begin the backscattering at a Kth symbol of at least one received data frame. The backscattering tag may include a symbol counting block configured to generate a symbol counting block output to: count occurrence of symbols 1 to K−1 in the at least one received data frame; and indicate start of the Kth symbol in the at least one received data frame.

In some embodiments, the symbol counting block may include a selector and a symbol counter. The selector may be configured to generate a selector output to select between a local reference clock signal and a recovered clock signal based on an input switchover control signal. The symbol counter may be configured to receive the selector output and generate the symbol counting block output.

In some embodiments, the symbol timing estimator may include a bandpass filter configured to receive the envelope detection output.

In some embodiments, the center frequency of the bandpass filter may be equal to a reference symbol frequency of the received data frames.

In some embodiments, the center frequency of the bandpass filter may be equal to a harmonic of the reference symbol frequency of the received data frames.

In some embodiments, the circuit may further include a frequency down-converter configured to generate a frequency down-converted output for the nominal constant envelope signal and provide the frequency down-converted output to the envelope detector to generate the envelope detection output.

In some embodiments, the frequency down-converted output may include a real intermediate frequency signal or a complex baseband I/Q (in-phase/quadrature) signal.

In some embodiments, the symbol timing estimator may include a phase-locked loop (PLL) configured to receive the envelope detection output, the PLL including a phase detector, a loop filter and a voltage-controlled oscillator (VCO).

In some embodiments, the symbol timing estimator may further include a bandpass filter configured to receive the envelope detection output, and the PLL may be configured to receive a bandpass filter output from the bandpass filter.

In some embodiments, a VCO control voltage may be determined for a first frame of the received data frames to lock a PLL frequency to a target frequency of the envelope detection output and the determined VCO control voltage may be applied to the VCO during one or more subsequent frames to maintain the PLL frequency locked to the target frequency.

In some embodiments, the PLL may further include a delay circuit configured to provide multiple delayed versions of a VCO output.

In some embodiments, the PLL may be further configured to use a phase detector output to select one of the multiple delayed versions of the VCO output, the selected version of the VCO output providing the closest phase matching to the symbol timing.

In some embodiments, the symbol timing estimator includes a first bandpass filter, a second bandpass filter, a frequency divider, and a phase resolver. The first bandpass filter may be configured to receive the envelope detection output, the first bandpass filter having a center frequency equal to a reference symbol frequency of the received data frames. The second bandpass filter may be configured to receive the envelope detection output, the second bandpass filter having a center frequency equal to a higher order harmonic of the reference symbol frequency of the received data frames. The frequency divider may be configured to generate multiple frequency divided outputs based on output from the second bandpass filter, each of the multiple frequency divided outputs having an identical frequency equal to a symbol frequency detected in the output from the second bandpass filter, and a different phase compared with other frequency divided outputs. The phase resolver may be configured to generate the symbol timing estimation output by selecting the frequency divided output having highest phase correlation with output from the first bandpass filter.

In some embodiments, the symbol timing estimator includes a first bandpass filter, a second bandpass filter, a PLL, a frequency divider, and a phase resolver. The first bandpass filter may be configured to receive the envelope detection output, the first bandpass filter having a center frequency equal to a reference symbol frequency of the received data frames. The second bandpass filter may be configured to receive the envelope detection output, the second bandpass filter having a center frequency equal to a higher order harmonic of the reference symbol frequency of the received data frames. The PLL may be configured to receive output from the second bandpass filter, a VCO center frequency of the PLL being equal to the higher order harmonic of the reference symbol frequency. The frequency divider may be configured to generate multiple frequency divided outputs based on output from the PLL, each of the multiple frequency divided outputs having an identical frequency equal to a symbol frequency detected in the output from the PLL, and a different phase compared with other frequency divided outputs. The phase resolver may be configured to generate the symbol timing estimation output by selecting the frequency divided output having highest phase correlation with output from the first bandpass filter.

In some embodiments, the symbol timing estimator may include a Fast Fourier Transform (FFT) block or a Discrete Fourier Transform (DFT) block configured to receive the envelope detection output and generate a complex frequency domain output to extract an amplitude, a frequency and a phase of one or more frequency components having the largest amplitudes.

In some embodiments, the symbol timing estimator may further include an additional processing block configured to receive the complex frequency domain output and extract timing information from the amplitude, the frequency and/or the phase of the one or more frequency components having the largest amplitudes.

In some embodiments, the additional processing block is an interpolation block configured to identify a maximum peak amplitude among the one or more frequency components having the largest amplitudes.

In some embodiments, the nominal constant envelope signal is a filtered phase modulated signal.

In some embodiments, the backscattering tag is further configured to identify a start of the received data frame in response to the envelope detection output meeting a threshold condition.

In another broad aspect, there is provided a method for estimating symbol timing in one or more received data frames of a nominal constant envelope signal. The method may include: generating an envelope detection output for the received data frames, the envelope detection output having an amplitude ripple associated with the symbol timing in the received data frames; and generating a symbol timing estimation output based on the amplitude ripple in the envelope detection output.

In some embodiments, the method may further include: generating, by a backscattering tag, a clock signal based on the symbol timing estimation output; and using the clock signal to encode backscattering tag data during backscattering of the received data frames.

In some embodiments, generating the symbol timing estimation output includes using a bandpass filter to filter the envelope detection output, wherein a center frequency of the bandpass filter is equal to i) a reference symbol frequency of the received data frames, or ii) a harmonic of the reference symbol frequency of the received data frames.

In some embodiments, the method may further include: generating a frequency down-converted output for the nominal constant envelope signal; and providing the frequency down-converted output to the envelope detector to generate the envelope detection output.

In some embodiments, generating the symbol timing estimation output may include applying the envelope detection output to a phase locked loop (PLL).

In some embodiments, generating the symbol timing estimation output may include: determining a voltage-controlled oscillator (VCO) control voltage for a first frame of the received data frames to lock a PLL frequency to a target frequency of the envelope detection output; and holding the determined VCO control voltage constant during one or more subsequent frames to maintain the PLL frequency locked to the target frequency.

Other features and advantages of the present application will become apparent from the following detailed description. It should be understood, however, that the detailed description and the specific examples, while indicating embodiments of the application, are given by way of illustration only and the scope of the claims should not be limited by these embodiments, but should be given the broadest interpretation consistent with the description as a whole.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

Figure 1A:
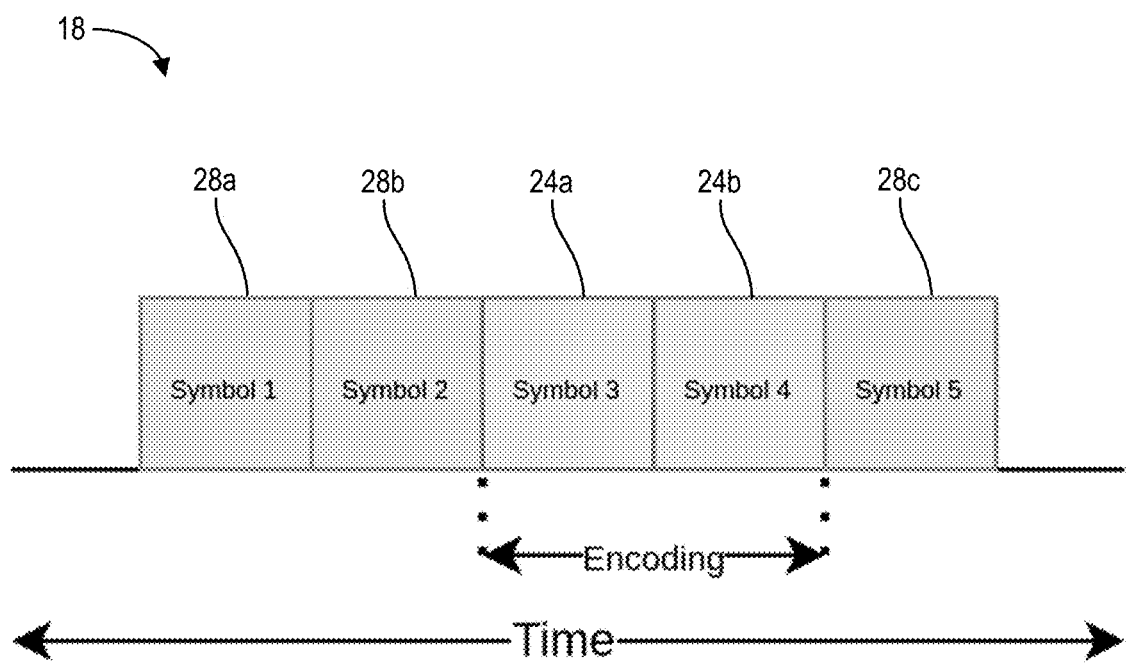
FIGS. 1A and 1B are diagrams showing a sequence of symbols in a data frame received at a backscattering tag of an example backscatter communication system.

Further aspects and features of the example embodiments described herein will appear from the following description taken together with the accompanying drawings.

DESCRIPTION OF VARIOUS EMBODIMENTS

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. As used herein, two or more parts are said to be "rigidly coupled", "rigidly connected", "rigidly attached", or "rigidly fastened" where the parts are coupled so as to move as one while maintaining a constant orientation relative to each other. None of the terms "coupled", "connected", "attached", and "fastened" distinguish the manner in which two or more parts are joined together.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

A receiver may use an envelope detector to estimate symbol timing within a received data frame. Envelope detectors can enable lower power receiver operation compared with other designs. However, envelope detectors may not be able to accurately estimate symbol timing for a constant envelope signal (e.g., a phase modulated signal or a frequency modulated signal). For example, the envelope detector may attempt to estimate symbol timing using the rising edge at the start of a received data frame. This generally requires high bandwidth and high accuracy (and commensurate high power consumption) and may not provide accurate symbol timing estimation for low received signal levels. Additionally, the symbol timing may only be estimated at the start (rising edge) of the received data frame and any estimation error may accumulate over multiple symbols in the received data frame.

However, in many application, the communicated signal is filtered at the transmitter and/or the receiver. The filtering process can generate an amplitude ripple (in the otherwise constant envelope signal) associated with the symbol timing. Such filtered signals are referred to herein as "nominal constant envelope" signals. The amplitude ripple introduced during the filtering process can increase the peak-to-average power ratio (PAPR) of the filtered signal. In some examples, the PAPR ratio of the nominal constant envelope signal may be in a 0-6 dB range. For example, an unfiltered constant envelope signal (e.g., an unfiltered binary phase shift keying (BPSK) signal or an unfiltered quadrature phase shift keying (QPSK) signal) may have 0 dB PAPR. The non-constant amplitude resulting from the filtering process (e.g., using a root-raised-cosine (RRC) filter may increase the PAPR to approximately 0.5 to 3 dB (based on the filter characteristics and RRC roll-off factor). As another example, a higher order modulation unfiltered signal (e.g., 16-QAM) may have a higher unfiltered PAPR and the filtered nominal constant envelope signal may have PAPR of approximately 4 to 6 dB. In other examples, the nominal constant envelope signal may have a different PAPR, for example, based on factors including the PAPR of the unfiltered signal and the specific implementation of the filtering process (e.g., roll-off factor in a raised-cosine filter).

The filter may be located at the transmitter and/or the receiver. In some embodiments, a transmitter may filter the modulated signal before transmission (e.g., to meet frequency spectrum regulatory requirements). The filter may be used to control the spectral mask of the emission including bandpass filters to reduce harmonics and other spurious in-band and out-of-band transmissions In some applications, the filter at the transmitter may include one or more of surface acoustic wave (SAW) filters, bulk acoustic wave (BAW) filters, LC filters and ceramic filters. In some applications, the transmitter may implement digital filtering to achieve sharp transition bandwidths. The digital filtering may be further combined with a RC filter to remove harmonics associated with conversion between digital and analog signals. In other applications, the filter at the transmitter may include any other suitable filter. In some embodiments, a transmitter antenna and/or a receiver antenna may include a filter that results in the nominal constant envelope signal having an amplitude ripple. In some embodiments, a receiver may include band limiting and channel limiting filters that result in the nominal constant envelope signal having an amplitude ripple. In some embodiments, a filter may be specifically added to generate the amplitude ripple that can be used for symbol timing estimation using the disclosed systems and methods.

For simplicity and ease of description, many example embodiments are described herein with reference to digital phase modulated signals such as Differential Binary Phase Shift Keying (DBPSK) 802.11 1 Mb/s Direct-Sequence Spread Spectrum (DSSS). However, the disclosed embodiments are not limited to such signals and may be implemented for any suitable nominal constant envelope signal.

The disclosed systems and methods use an envelope detector to detect an amplitude ripple in a received data frame of a nominal constant envelope signal. The detected amplitude ripple can indicate the symbol timing in the received data frame. The ability to use envelope detectors for symbol timing estimation enables the disclosed systems and methods to provide low-power or ultra-low-power operation.

Further, the detected amplitude ripple is not limited to the start of the received data frame (that cause the accuracy and power issues associated with the rising edge detection as described herein above). Instead, the amplitude ripple detection can be conducted for the duration of the received data frame (e.g., each phase transition in a Phase Shift Keying (PSK) signal may be associated with a dip in the amplitude waveform). This can enable the symbol timing estimation at multiple instances within the received data frame and avoid the error accumulation issues (as described herein above) associated with relying entirely on the rising edge detection at the start of the received data frame.

By using an envelope detector that can detect the amplitude ripple occurring for the duration of a received data frame, the disclosed systems and methods can enable low-power operation while providing high-accuracy symbol timing estimation. The disclosed systems and methods can enable, for example, ultra-low-power radio operation in ambient-powered IoT device applications.

The disclosed systems and methods can enable improvements in operational efficiency of backscatter communication systems. Backscatter communication has attracted interest for applications such as implantable sensors, wearables, and smart home sensing because of its ability to offer low power connectivity to these sensors. Such applications have severe power constraints. Implantable sensors for example have to last for years, while even more traditional smart home monitoring applications may benefit from sensors and actuators that can last several years. The disclosed systems and methods can enable backscatter communication systems to meet the connectivity requirements while consuming such low power as to be energized by harvesting energy, or with batteries that could last several years.

A backscattering tag of a backscatter communication system may apply different methods to manipulate a transmitted signal (for encoding the backscattering tag data) and generate a backscattered signal. The backscattering communication systems and methods can include, for example, the systems and methods described in U.S. Pat. No. 10,338,205 to Zhang et al., filed Aug. 14, 2017 and issued Jul. 2, 2019; U.S. Pat. No. 11,483,836 to Zhang et al., filed Apr. 25, 2019, and issued Oct. 25, 2022; United States Publication No. 2023/0244883 to Nielsen et al., filed Jan. 27, 2023; all three of which are hereby incorporated by reference in their entirety.

Figure 1B:
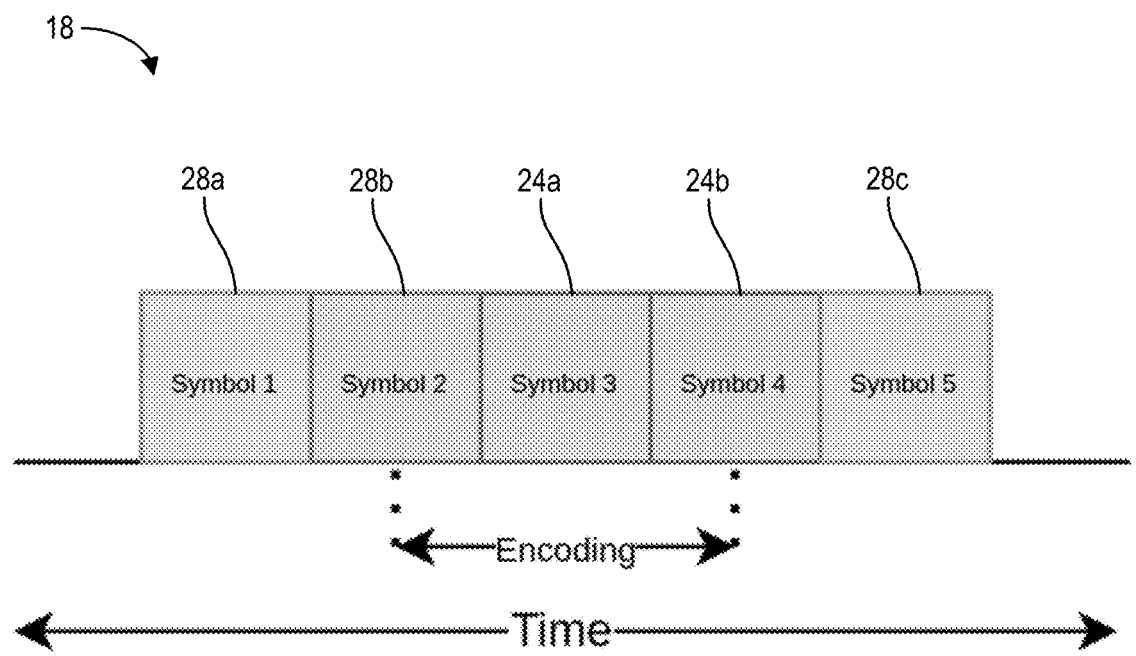

Reference is now made to FIGS. 1A and 1B. FIGS. 1A and 1B are diagrams showing a sequence of symbols 18 in a data frame received at a backscattering tag of a backscatter communication system. The sequence of symbols includes symbols 24a and 24b to be used for encoding backscattering tag data during backscattering and symbols 28a-28c that are intended to be unmodified during the backscattering (e.g., symbols 28a-28c may include transmitting unit data).

In the example illustrated in FIG. 1A, the symbol timing estimation at the backscattering tag is sufficiently accurate. The backscattering tag only modifies symbols 24a and 24b to encode the backscattering tag data and does not modify symbols 28a-28c.

In the example illustrated in FIG. 1B, the symbol timing estimation at the backscattering tag is not sufficiently accurate. The backscattering tag modifies symbols 28b, 24a, and 24b to encode the backscattering tag data. As a result of the inaccurate symbol timing estimation, the backscattering tag modifies symbol 28a, which was intended to be unmodified during the backscattering. This can cause errors in decoding the backscattering tag data and/or loss of the unintentionally modified transmitting unit data.

To compensate for inaccurate symbol timing estimation, many backscatter communication systems assign multiple consecutive symbols of a received data frame (e.g., 2 to 4 consecutive symbols) for encoding a single symbol of the backscattering tag data. This can reduce errors in decoding the backscattering tag data and reduce unintentional loss of transmitting unit data. However, this technique reduces the operational efficiency of the backscatter communication system because multiple symbols of a received data frame must be utilized for encoding each symbol of the backscattering tag data.

The disclosed systems and methods can enable accurate symbol timing estimation so that only a single symbol of a transmitted data frame is needed to encode one symbol of the backscattering tag data. This can reduce the above-described errors associated with decoding the backscattering tag data and unintentional loss of transmitting unit data, while also enabling high operational efficiency of the backscatter communication system.

Furthermore, frame check sequence preservation of a received data frame during backscatter communication may require that only a single symbol of a transmitted data frame is used for encoding one symbol of the backscattering tag data. By providing accurate symbol timing estimation, the disclosed systems and methods can enable usage of only a single symbol of the transmitted data frame for encoding one symbol of the backscattering tag data, thereby enabling frame check sequence preservation during backscatter communication. The systems and methods for frame check sequence preservation during backscatter communication can include, for example, the systems and methods described in U.S. Pat. No. 11,962,412 to Kezys et al., filed Dec. 18, 2023 and issued Apr. 16, 2024; which is hereby incorporated by reference in its entirety.

Figure 2:
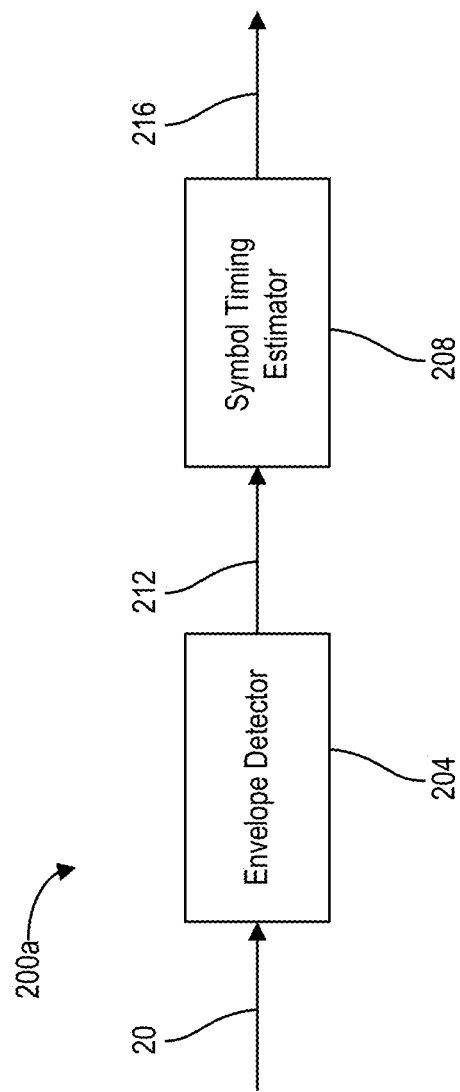
FIG. 2 is a block diagram of a circuit for estimating symbol timing in a received signal, in accordance with an example embodiment.

Reference is now made to FIG. 2, which is a block diagram of a circuit 200a for estimating symbol timing in a received signal. In the illustrated example embodiment, circuit 200a includes an envelope detector 204 and a symbol timing estimator 208.

The received signal may be any nominal constant envelope signal, for example, a filtered phase modulated signal. The received signal may include multiple data frames 20 and circuit 200a can estimate symbol timing within received data frames 20.

Envelope detector 204 may have any suitable design to generate an envelope detection output 212 for received data frames 20. As described herein above, the nominal constant envelope signal can include an amplitude ripple that indicates the symbol timing within received data frames 20. Envelope detection output 212 generated by envelope detector 204 can include corresponding amplitude changes that are associated with the symbol timing within received data frames 20.

Figure 3:
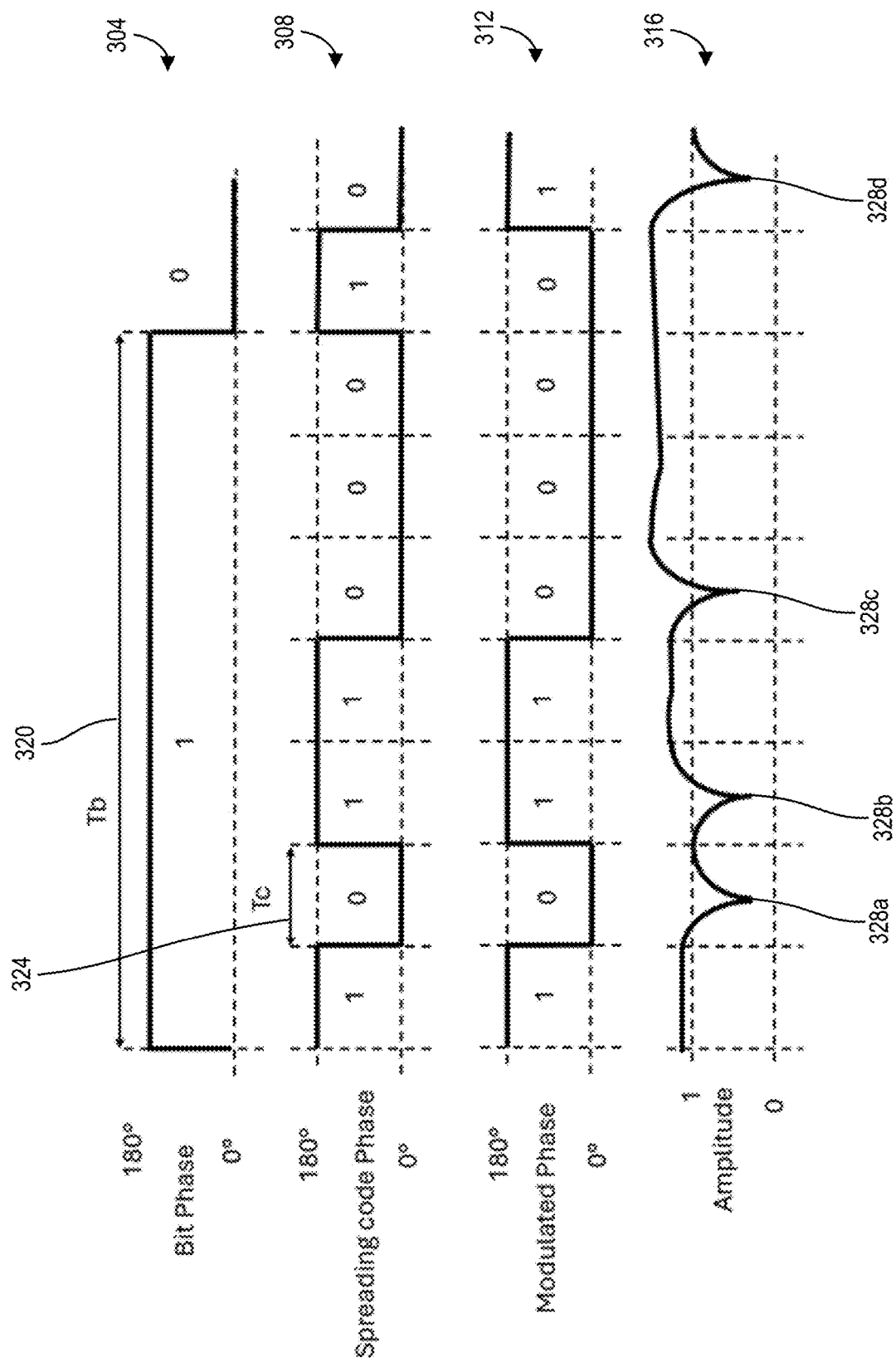
FIG. 3 shows timing diagrams associated with an example received data frame and the corresponding envelope detection output generated by an envelope detector of the circuit of FIG. 2.

Reference is now made to FIG. 3, which shows timing diagrams 304-316 associated with an example received data frame and the corresponding envelope detection output generated by an envelope detector.

Timing diagram 304 shows bit phase transitions of a Binary Phase Shift Keying (BPSK) waveform associated with the data being transmitted. The BPSK waveform may have a bit duration 320 ($T_b$) for each data bit being transmitted.

Timing diagram 308 shows phase transitions for an example spreading code "1 0 1 1 0 0 0" for generating a spread spectrum modulated signal. Each chip of the spreading code may have a chip duration 324 ($T_c$). In the illustrated example, the spread spectrum modulation utilizes 7 chips per bit. In other examples, any other suitable number of chips per bit may be utilized.

Timing diagram 312 shows the phase transitions of the spread spectrum modulated signal generated based on the BPSK waveform and the "1 0 1 1 0 0 0" spreading code. The generated spread spectrum modulated signal may be filtered and transmitted by a transmitting unit. The filtering action may introduce an amplitude ripple in the envelope of the transmitted spread spectrum modulated signal. Each dip in the amplitude waveform may correspond to a phase transition of the spread spectrum modulated signal.

The transmitted signal may be received at an envelope detector (e.g., envelope detector 204 shown in FIG. 2). Timing signal 316 shows an example envelope detection output generated by the envelope detector. The envelope detection output can include an amplitude ripple. The amplitude ripple waveform may include multiple amplitude dips 328a-328d associated with the phase transitions of the spread spectrum modulated signal. As seen in FIG. 3, there may be a delay between the occurrence of a modulated phase bit transition (timing diagram 312) and a corresponding amplitude dip (timing diagram 316) because of a group delay response of the filter used for filtering the spread spectrum modulated signal. In some applications, an offset value may be used in combination with the estimated symbol timing that includes an adjustment for the delay.

Figure 4:
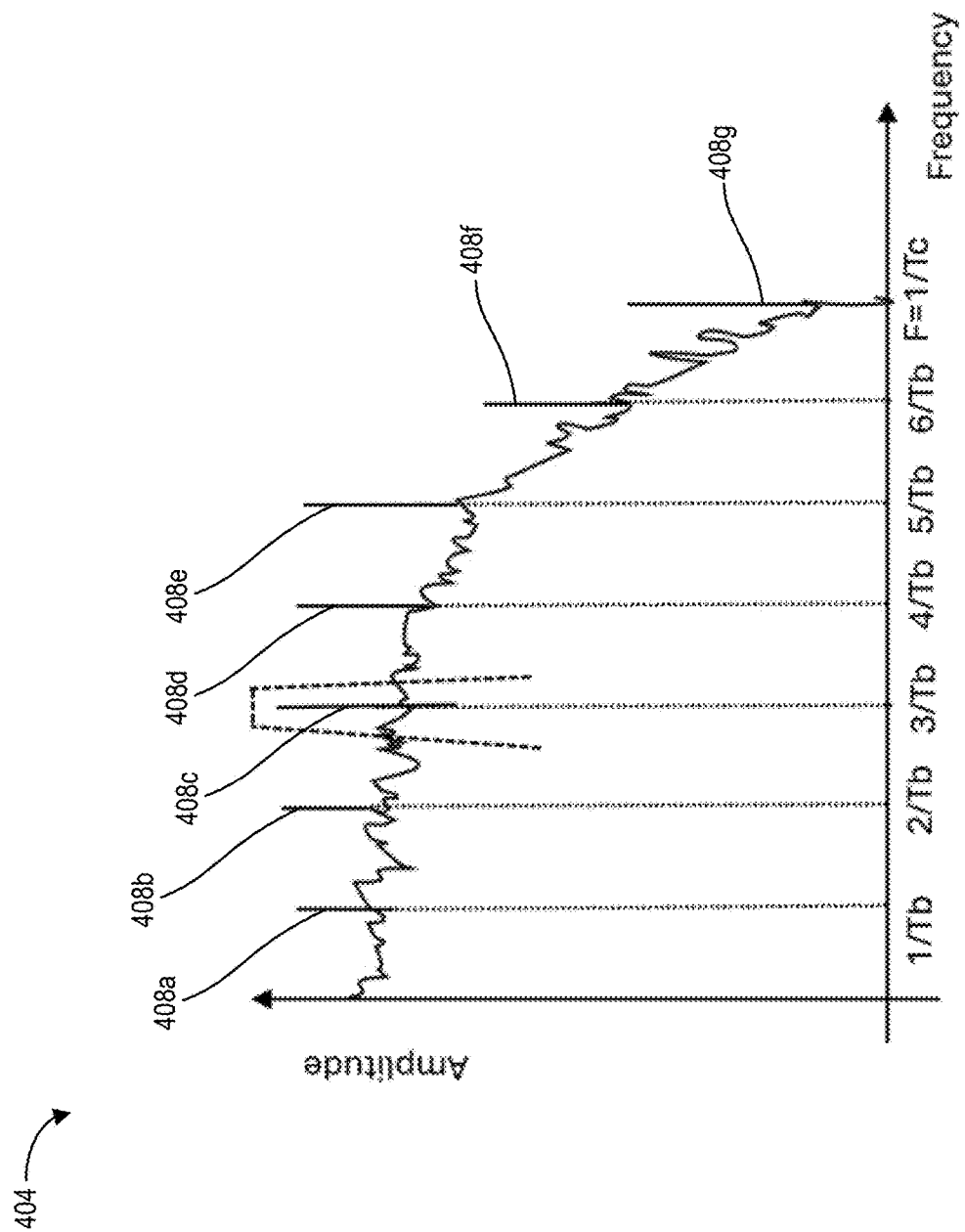
FIG. 4 is a frequency spectrum plot of the envelope detection output of FIG. 3.

Reference is now made to FIG. 4, which shows a frequency spectrum plot 404 of the envelope detection output. Frequency spectrum plot 404 shows multiple spectral peaks 408a-408g corresponding to the bit frequency $f_b$ ($1/T_b$), higher harmonics of $f_b$, and the chip frequency $f_c$ ($1/T_c$). The noise floor may be attributed to the random nature of the transmitted data. As described in further detail herein, symbol timing estimator 208 (shown in FIG. 2) can be used to isolate and extract any suitable spectral peak signal. For example, the symbol timing estimator may include a filter that can be used to isolate and extract the signal associated with spectral peak 408c at $3/T_b$ frequency.

Figure 5:
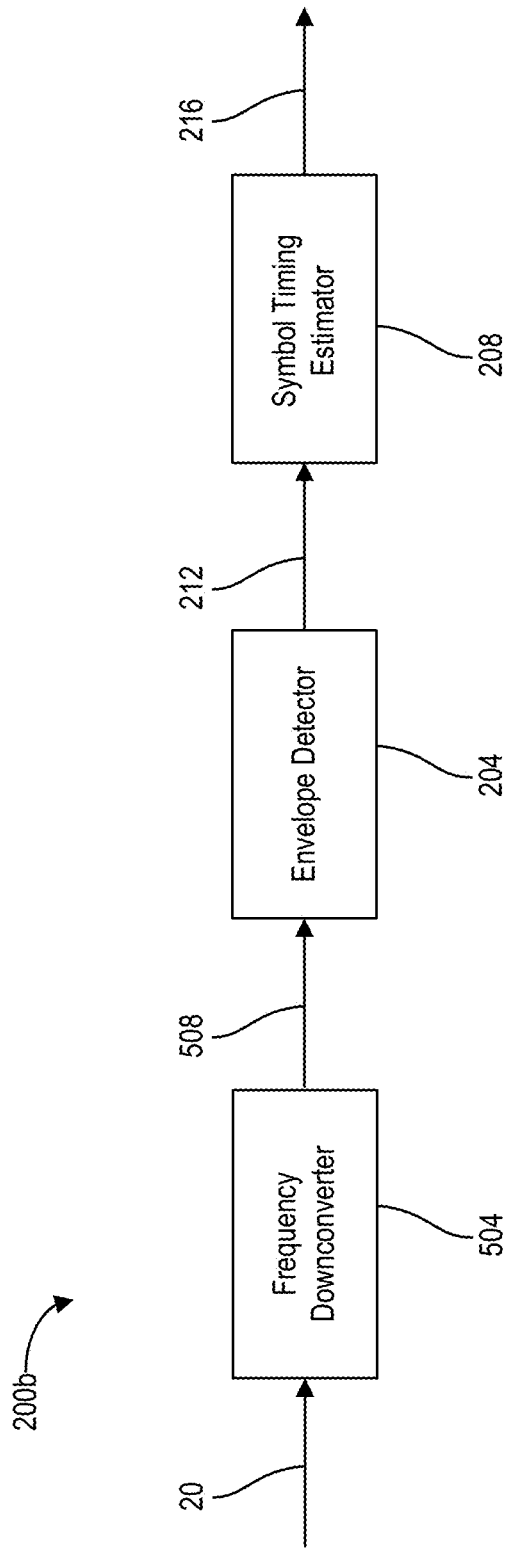
FIG. 5 is a block diagram of a circuit for estimating symbol timing in a received signal, in accordance with another example embodiment.

In some embodiments, the symbol timing estimation circuit may include a frequency down-converter. Reference is now made to FIG. 5, which is a block diagram of a circuit 200b for estimating symbol timing in a received signal. The received signal may be any nominal constant envelope signal and may include multiple data frames 20. Circuit 200b can generate a symbol timing estimation output 216 indicating the symbol timing within received data frames 20.

In the illustrated example embodiment, circuit 200b includes a frequency downconverter 504, envelope detector 204 and symbol timing estimator 208. Frequency downconverter 504 may generate a frequency down-converted output 508 for the received signal and provide the frequency down-converted output 508 to envelope detector 204.

Frequency downconverter 504 may be configured to perform any suitable frequency down conversion. For example, frequency downconverter 504 may down convert a received RF signal to an intermediate frequency (IF) signal or a baseband frequency signal. The frequency down conversion may enable improved filtering of adjacent channel noise. Frequency downconverter 504 can provide the frequency down-converted, and optionally filtered, output 508 to envelope detector 204. Envelope detector 204 can generate envelope detection output 212, as described herein above, to include an amplitude ripple indicating symbol timing within received data frames 20.

Envelope detector 204 (shown in FIGS. 2 and 5) may use any suitable technique to generate envelope detection output 212. For example, the envelope detection output may be based on an absolute value or a squared value of the input signal envelope. The input signal may be, for example, a RF signal (in circuit 200a shown in FIG. 2) or a down converted signal (in circuit 200b shown in FIG. 5).

Figure 6A:
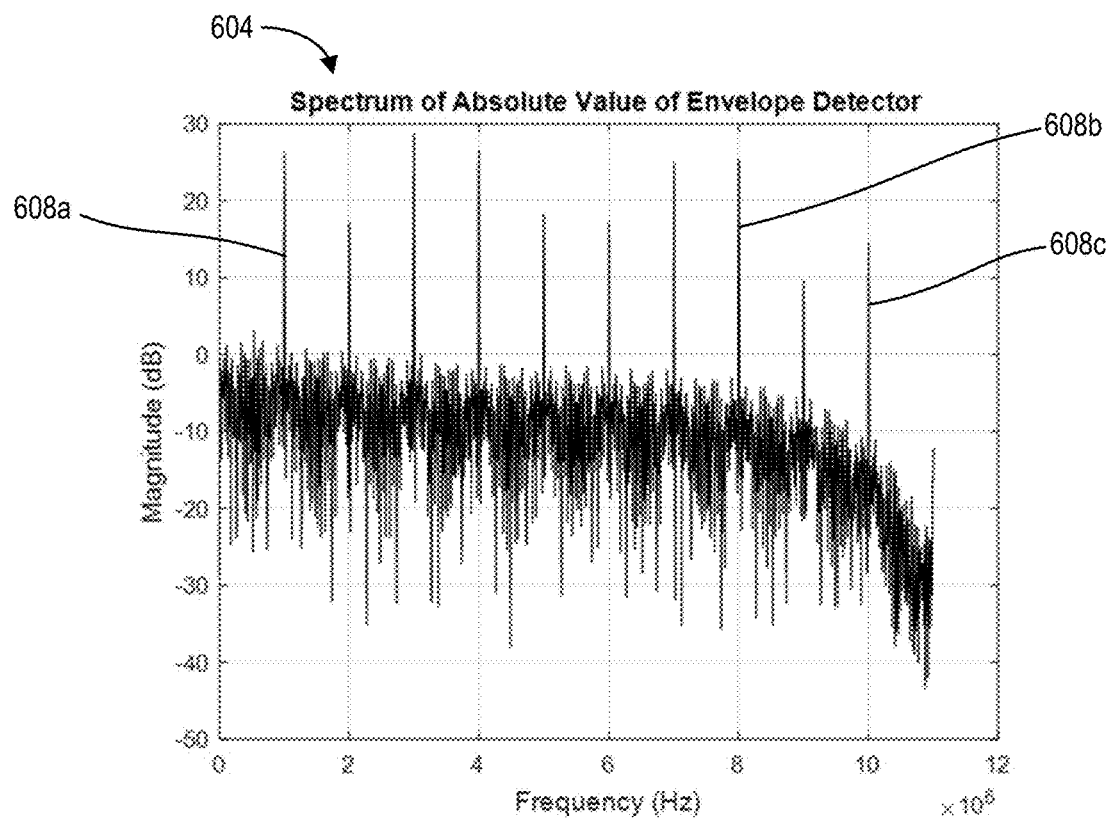
FIG. 6A is a frequency spectrum plot of the absolute value of the envelope of an example input signal to the circuit of FIG. 2 (or FIG. 5)
Figure 6B:
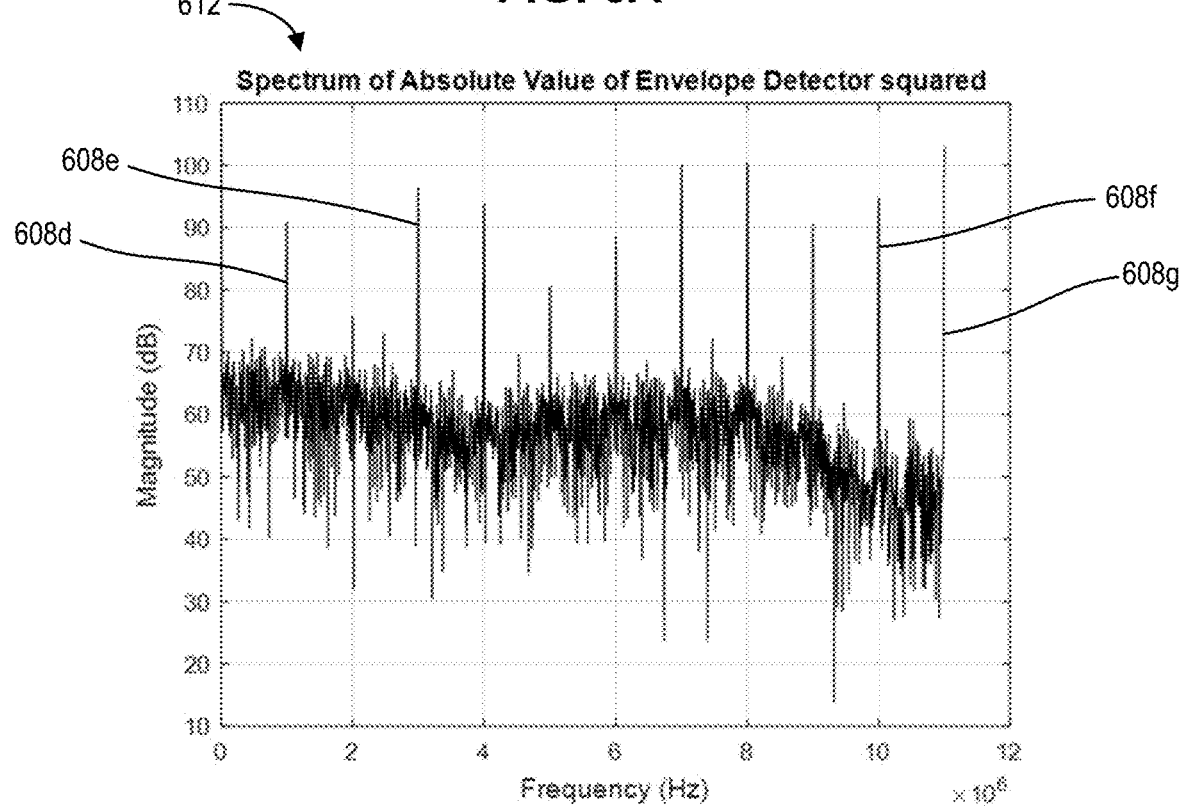
FIG. 6B is a frequency spectrum plot of the squared value of the envelope of the example input signal of FIG. 6A.

Reference is now made to FIGS. 6A and 6B. FIG. 6A is a frequency spectrum plot 604 of the absolute value of an example input signal envelope having a 1 MHz bit frequency (fb). FIG. 6B is a frequency spectrum plot 612 of the squared value of the example input signal envelope. Both frequency spectrum plots 604 and 612 show multiple spectral peaks 608 at harmonic frequencies of the 1 MHz bit frequency (fb) (to preserve clarity of FIGS. 6A and 6B, all the observed peaks are not labeled with reference numerals). A symbol timing estimator may be used to isolate and extract the signal associated with any suitable spectral peak 608 to estimate the symbol timing.

Referring back to FIG. 5, in some embodiments, circuit 200b may implement a complex down-conversion and the envelope detection output may be generated using the sum of squares of the in-phase (I) and quadrature (Q) values.

In some embodiments, envelope detector 204 may use a logarithm value to generate the envelope detection output. Using the logarithm to generate the envelope detection output may enable compression of the dynamic range of the signal. For example, the envelope detection output may be generated using a logarithm of the envelope absolute value, a logarithm of the envelope squared value, or a logarithm of the sum of squares of the I and Q values.

Referring now to both FIGS. 2 and 5, symbol timing estimator 208 can be configured to receive envelope detection output 212 from envelope detector 204. Symbol timing estimator 208 may have any suitable design to generate a symbol timing estimation output 216 based on the amplitude ripple included in envelope detection output 212.

Symbol timing estimation output 216 can include any suitable waveform depending on the intended usage of the symbol timing estimation output. For example, symbol timing estimation output 216 can include a sinusoidal signal. In some embodiments, the sinusoidal signal may be thresholded (e.g., using a data slicer) to generate a square wave that can be used as a clock signal.

Figure 7:
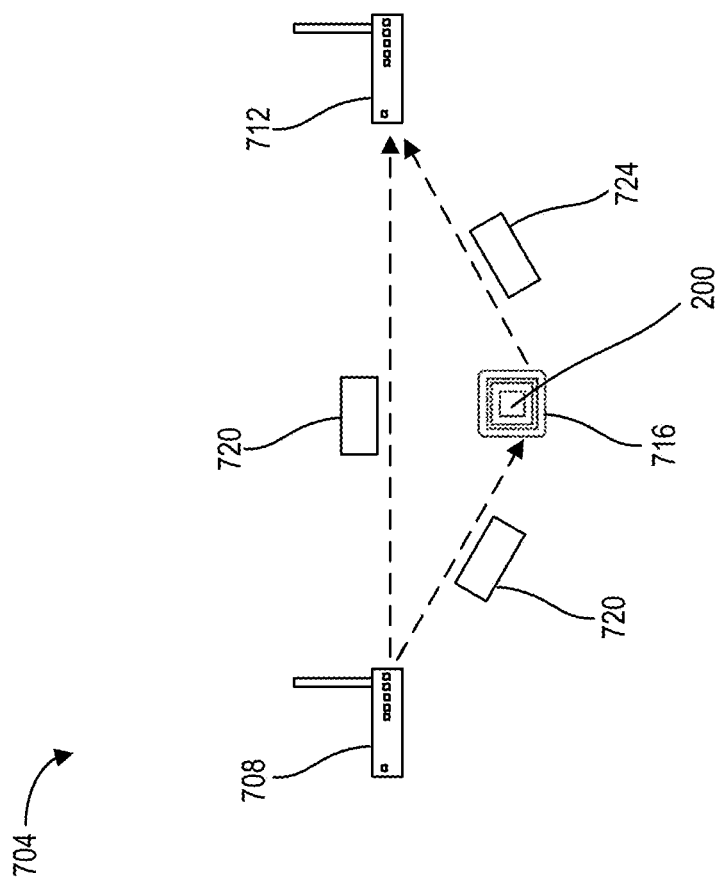
FIG. 7 is a schematic diagram of a backscatter communication system that includes a backscattering tag including the circuit of FIG. 2 (or FIG. 5)

Reference is now made to FIG. 7, which is a schematic diagram of a backscatter communication system 704 that includes a transmitting unit 708, a receiving unit 712 and a backscattering tag 716. Transmitting unit 708 may be configured to transmit a signal that includes one or more transmitted data frames 720. The transmitted signal may be an IEEE802.11 compliant WLAN signal and transmitted data frames 720 may be IEEE802.11 compliant WLAN data frames. Receiving unit 712 may be any suitable device configured to receive the transmitted signal.

Backscattering tag 716 may be any suitable device that operates to intercept transmitted data frames 720. In particular, backscattering tag 716 may be configured to manipulate the intercepted frames so as to encode backscattering tag data. Backscattering tag 716 may backscatter the transmitted signal to form a backscattered signal that includes one or more backscattered data frames 724. Backscattered data frames 724 can include the backscattering tag data. Backscattering tag 716 may be configured such that the backscattered signal is an 802.11b compliant Wi-Fi signal and backscattered data frames 724 are 802.11b compliant Wi-Fi data frames.

In the illustrated embodiment, backscattering tag 716 includes a circuit 200 (e.g., circuit 200a (shown in FIG. 2) or circuit 200b (shown in FIG. 5)) for estimating symbol timing in data frames 720. Backscattering tag 716 may generate a clock signal based on the symbol timing estimation output from circuit 200. In some embodiments, the symbol timing estimation output from circuit 200 may be directly used as the clock signal for encoding the backscattering data. In some embodiments, the symbol timing estimation output from circuit 200 may be processed to meet clock signal requirements (e.g., waveform type, waveform amplitude, waveform duty ratio). Backscattering tag 716 can use the generated clock signal to modify symbols in data frames 720 (to encode the backscattering tag data) and generate backscattered data frames 724.

Circuit 200 can enable sufficiently accurate symbol timing estimation so that backscattering tag 716 can be configured to only modify a single symbol of data frame 720 to encode each symbol of the backscattering tag data. As described herein above, this can improve the operational efficiency of backscattering tag 716 and enable frame check sequence preservation to be implemented.

Figure 8:
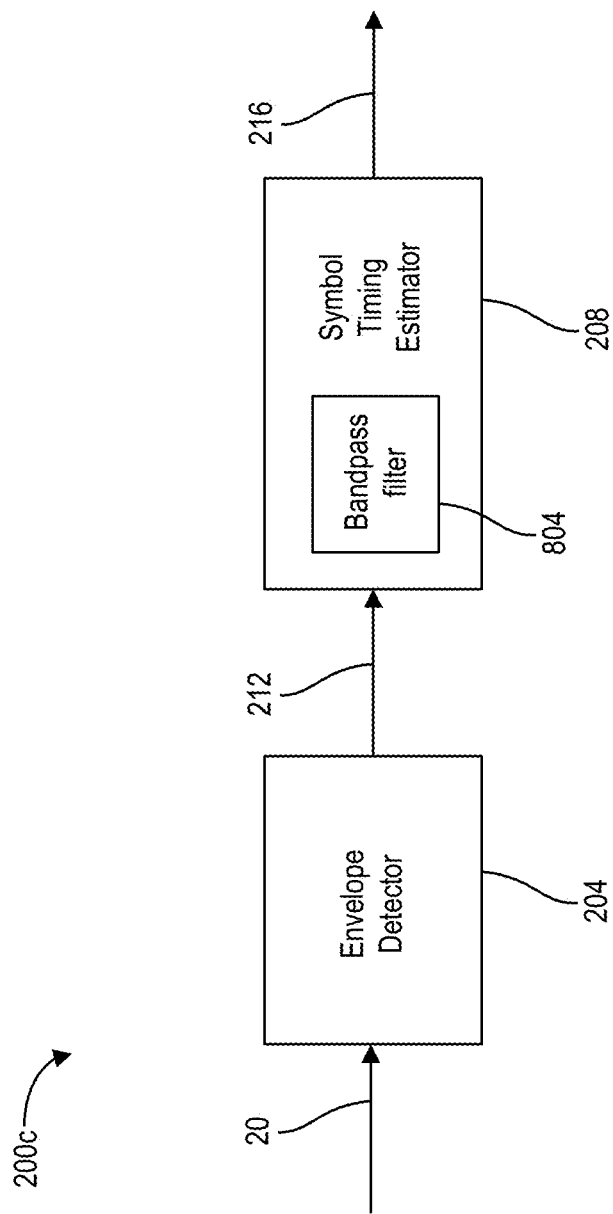
FIG. 8 is a block diagram of a circuit for estimating symbol timing in a received signal, in accordance with another example embodiment.

Reference is now made to FIG. 8, which is a block diagram of a circuit 200c for symbol timing estimation in received data frames 20. Circuit 200c includes envelope detector 204 and symbol timing estimator 208.

In the illustrated example embodiment, symbol timing estimator 208 includes a bandpass filter 804 that is configured to receive the envelope detection output 212 from envelope detector 204. Bandpass filter 804 can isolate and extract the signal associated with a suitable spectral peak from the envelope detection output 212 to generate a bandpass filter output. Bandpass filter 804 can select the spectral peak of the envelope detection output 212 corresponding to a center frequency of bandpass filter 804 and attenuate the other spectral peaks. In some embodiments, circuit 200c may directly provide the bandpass filter output from bandpass filter 804 as symbol timing estimation output 216. In other embodiments, circuit 200c may further process the bandpass filter output (e.g., using a PLL to improve signal to noise ratio, as described herein below) to generate the symbol timing estimation output 216.

In some embodiments, the center frequency of bandpass filter 804 may be equal to a reference symbol frequency $f_s=1/T_s$, where $T_s$ denotes a reference duration of each symbol within the data frame. For example, each symbol may correspond to a bit and the center frequency of bandpass filter 804 may be equal to a reference bit frequency $f_b=1$ MHz. In this example, for the frequency spectrum plot 404 shown in FIG. 4, bandpass filter 804 can select the 408a spectral peak and attenuate the other spectral peaks in the envelope detection output.

In some embodiments, the center frequency of bandpass filter 804 may be equal to a higher order harmonic of the reference symbol frequency. Based on the signal characteristics of the received data frames, a specific higher order harmonic spectral peak in the envelope detection output may have a superior signal-to-noise ratio compared with the other spectral peaks (including the fundamental harmonic spectral peak). The center frequency of bandpass filter 804 may be configured to select the higher order harmonic spectral peak with the superior signal-to-noise ratio. For example, bandpass filter 804 may have a center frequency equal to three times the reference bit frequency to select the 408c spectral peak shown in the frequency spectrum plot 404 of FIG. 4 (and attenuate the other spectral peaks including the 408a spectral peak).

In example embodiments where bandpass filter 804 is configured to select the higher order harmonic spectral peak (e.g., $3/T_s$), a frequency of the bandpass filter output signal may be divided to generate symbol timing estimation output having a frequency equivalent to the symbol frequency ($1/T_s$). However, the frequency division can introduce a phase ambiguity in the frequency divided output. For example, the bandpass filter 804 may be configured to select a Mth harmonic spectral peak and a frequency divider may be used to divide the frequency of the bandpass filter output signal by M. The frequency divider can generate M outputs, each output having a frequency equivalent to the symbol frequency ($1/T_s$) and an associated phase ambiguity of 360/M degrees. In some embodiments, a phase resolver may be used to resolve the phase ambiguity associated with the frequency division.

Figure 9:
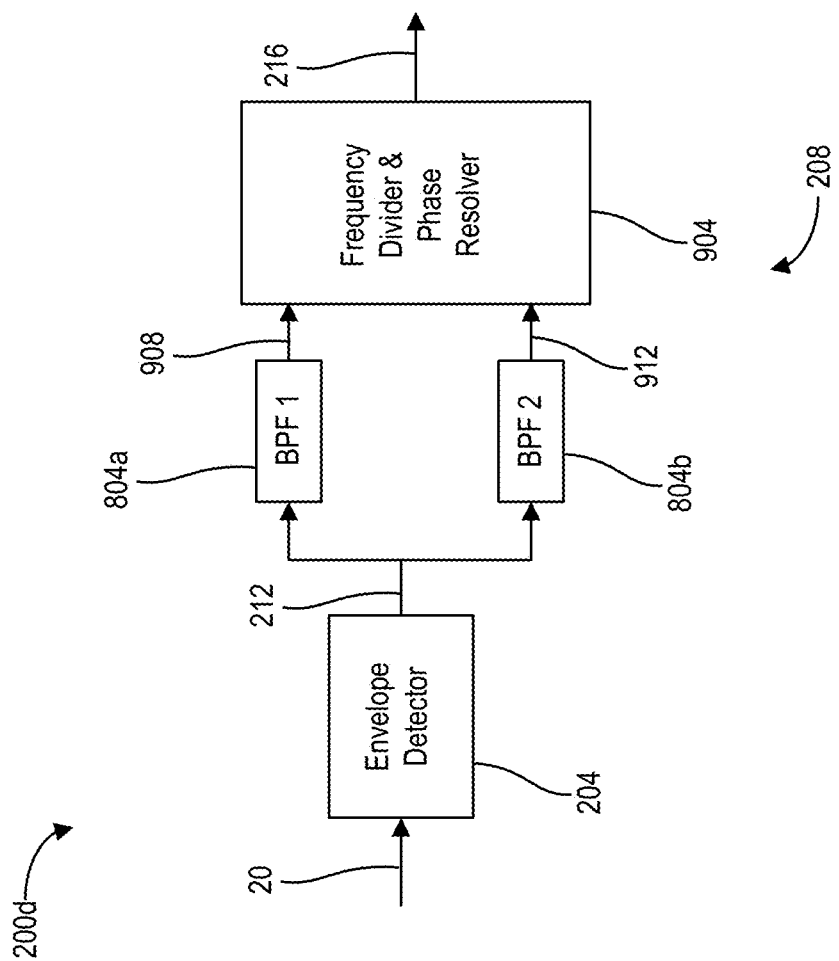
FIG. 9 is a block diagram of a circuit for estimating symbol timing in a received signal, in accordance with another example embodiment.

Reference is now made to FIG. 9, which is a block diagram of a circuit 200d for symbol timing estimation in received data frames 20. Circuit 200d includes envelope detector 204 and symbol timing estimator 208. In the illustrated example embodiment, symbol timing estimator 208 includes first bandpass filter 804a, a second bandpass filter 804b and a frequency divider and phase resolver 904.

First bandpass filter 804a may be configured to receive the envelope detection output 212 (from envelope detector 204) and generate a first bandpass filter output 908. First bandpass filter 804*a* may have a center frequency equal to a reference symbol frequency $f_s$ ($1/T_s$). First bandpass filter 804*a* can isolate and extract the signal (from envelope detection output 212) associated with the spectral peak corresponding to the symbol frequency.

Second bandpass filter 804*b* may be configured to receive the envelope detection output 212 (from envelope detector 204) and generate a second bandpass filter output 912. Second bandpass filter 804*b* may have a center frequency equal to a higher order harmonic of the reference symbol frequency $f_s$ ($1/T_s$). Second bandpass filter 804*b* can isolate and extract the signal (from envelope detection output 212) associated with the spectral peak corresponding to the higher order harmonic of the symbol frequency (e.g., $2f_s$, $3f_s$, $4f_s$, etc.). The higher order harmonic may be selected, for example, to extract a spectral peak signal having a higher signal-to-noise ratio.

Frequency divider and phase resolver 904 may be configured to receive first bandpass filter output 908 and second bandpass filter output 912. Frequency divider and phase resolver 904 may have any suitable design to divide the frequency of the second bandpass filter output 912 (corresponding to the higher order harmonic of the symbol frequency) to the fundamental harmonic of the symbol frequency and to resolve the phase ambiguity associated with the frequency division.

Figure 10:
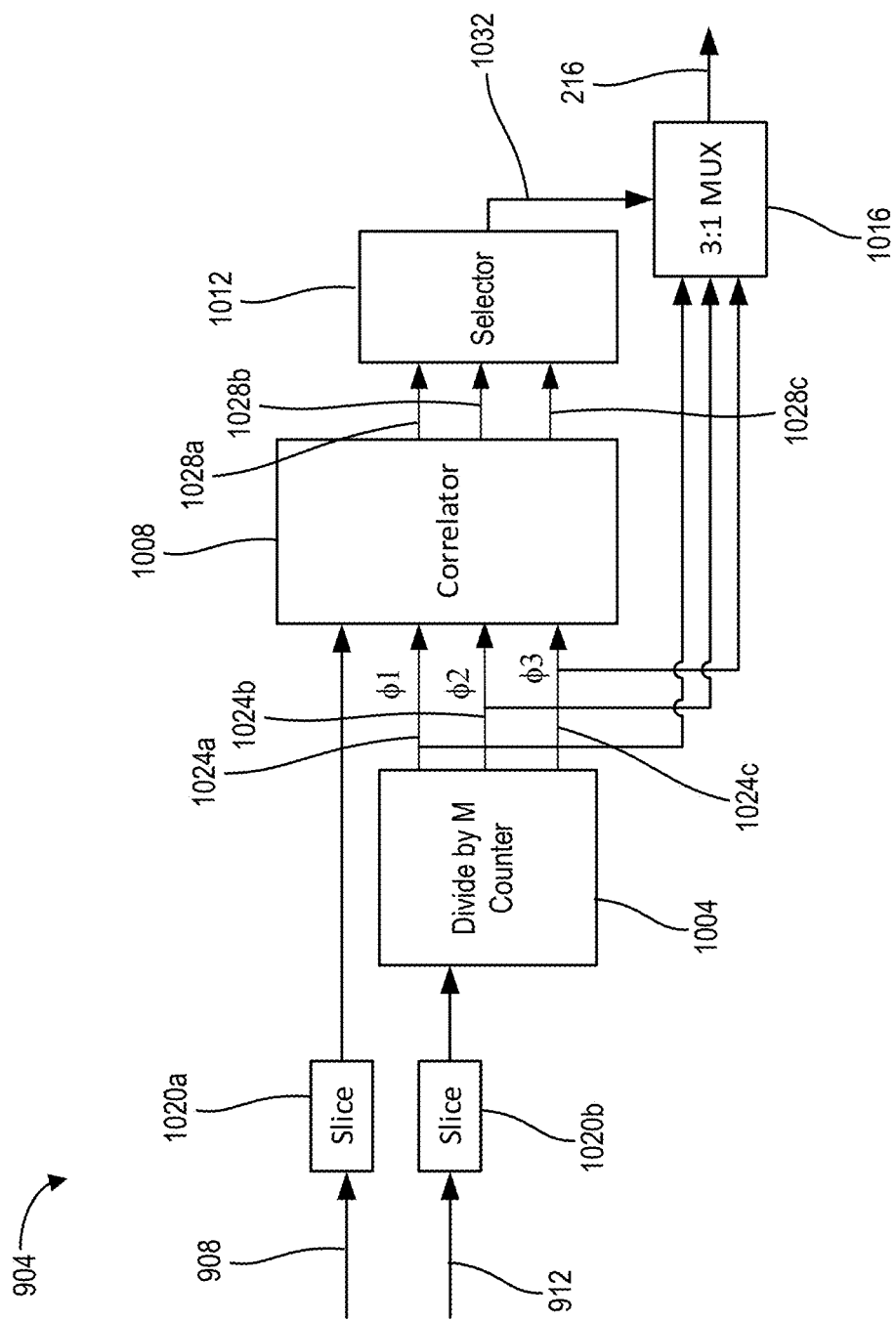
FIG. 10 is a block diagram of a frequency divider and phase resolver of the circuit of FIG. 9, in accordance with an example embodiment.

Reference is now made to FIG. 10, which is a block diagram of an example embodiment of frequency divider and phase resolver 904 that may be used in combination with a second bandpass filter having a center frequency equal to a Mth order harmonic of the reference symbol frequency. M=3 in the illustrated example embodiment, however the design of frequency divider and phase resolver 904 can be modified to implement other values of M.

Frequency divider and phase resolver 904 may include a divide by M counter 1004, a correlator 1008, a selector 1012, and a multiplexer 1016. Optionally, frequency divider and phase resolver 904 may include slicers 1020*a* and 1020*b*. Slicers 1020 may operate to convert sinusoidal signals in the first bandpass filter output 908 and the second bandpass filter output 912 to suitable digital signals (e.g., binary 0/1 signals) for processing by other components of frequency divider and phase resolver 904.

Any suitable design may be used for implementation of divide by M counter 1004. In some embodiments, divide by M counter 1004 may include a Johnson counter. Divide by M counter 1004 may be configured to receive second bandpass filter output 912 (associated with the Mth order harmonic spectral peak of the envelope detection output) and generate M number of frequency divided outputs with different phases. In the illustrated example, divide by M counter 1004 generates three frequency divided outputs 1024*a*, 1024*b* and 1024*c*, each frequency divided output 1024 having an identical frequency equal to a symbol frequency extracted within the second bandpass filter output 912. Each frequency divided output 1024 can include a phase ambiguity of 360/M degrees (120 degrees in the illustrated example).

Frequency divider and phase resolver 904 can resolve the phase ambiguity by inputting the first bandpass filter output 908 and each frequency divided output 1024 (the three frequency divided outputs 1024*a*-1024*c* in the illustrated example) into correlator 1008. Correlator 1008 can have any suitable design to generate M number of outputs 1028 (three outputs 1028*a*-1028*c* in the illustrated example) indicating the phase correlation between the first bandpass filter output 908 and each frequency divided output 1024. For example, correlator output 1028*a* can indicate the phase correlation between the first bandpass filter output 908 and frequency divided output 1024*a*.

Figure 11:
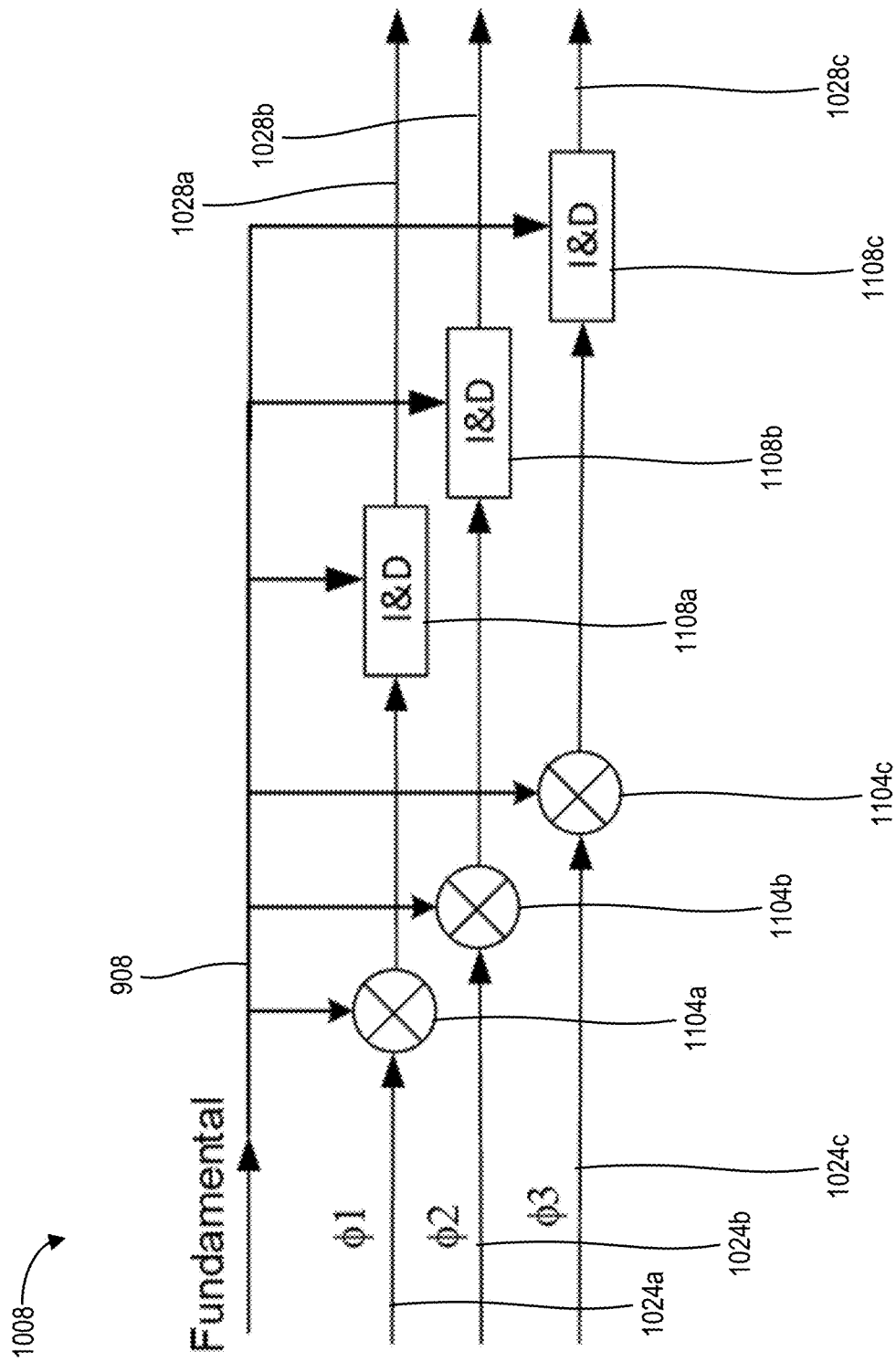
FIG. 11 is a block diagram of a correlator of the frequency divider and phase resolver of FIG. 10, in accordance with an example embodiment.

Reference is now made to FIG. 11, which is a block diagram of an example embodiment of correlator 1008 implemented for M=3. In other embodiments, the design of correlator 1008 may be modified for other values of M. In the illustrated example embodiment, correlator 1008 can indicate the phase correlation between the first bandpass filter output 908 (corresponding to a fundamental harmonic of the symbol frequency) and the three frequency divided outputs 1024*a*-1024*c* (each having the same fundamental harmonic symbol frequency but having different phases).

Correlator 1008 may include M number of multipliers 1104 (three multipliers 1104*a*-1104*c* in the illustrated example) and M number of integrate and dump 1108 (three integrate and dump 1108*a*-1108*c* in the illustrated example). As shown in FIG. 11, each multiplier 1104 may multiply a frequency divided output 1024 with the first bandpass filter output 908 (e.g., multiplier 1104*b* may multiply frequency divided output 1024*b* with the first bandpass filter output 908). The output of each multiplier 1104 may be applied to a corresponding integrate and dump 1108, which is dumped every period of the fundamental harmonic symbol frequency. In the illustrated example, outputs of multipliers 1104*a*-1104*c* are applied to integrate and dump 1108*a*-1108*c* respectively. The frequency divided output 1024 having the highest phase correlation with the first bandpass filter output 908 can result in the highest output 1028 value from the corresponding integrate and dump 1108. For example, output 1028*c* from integrate and dump 1108*c* may have the highest value indicating that frequency divided output 1024*c* has the highest phase correlation with the first bandpass filter output 908.

Referring back to FIG. 10, selector 1012 can have any suitable design to select the correlator output 1028 indicating highest phase correlation. Output 1032 from selector 1012 can indicate which of the frequency divided outputs 1024 has the highest phase correlation with the first bandpass filter output 908. For example, output 1028*c* may have a higher value compared with outputs 1028*a* and 1028*b*. Selector 1012 may select output 1028*c* as indicating that frequency divided output 1024*c* is closest in phase to the first bandpass filter output 908. Selector 1012 may provide a selector output 1032 to multiplexer 1016 to select the corresponding frequency divided output 1024*c*, which is closest in phase to the first bandpass filter output 908, to enable resolution of the phase ambiguity.

Circuit 200*d* (FIG. 9) may directly provide the output from multiplexer 1016 as symbol timing estimation output 216. Optionally, circuit 200*d* may further process the output from multiplexer 1016 (e.g., to improve signal to noise ratio) to generate the symbol timing estimation output 216.

Figure 12:
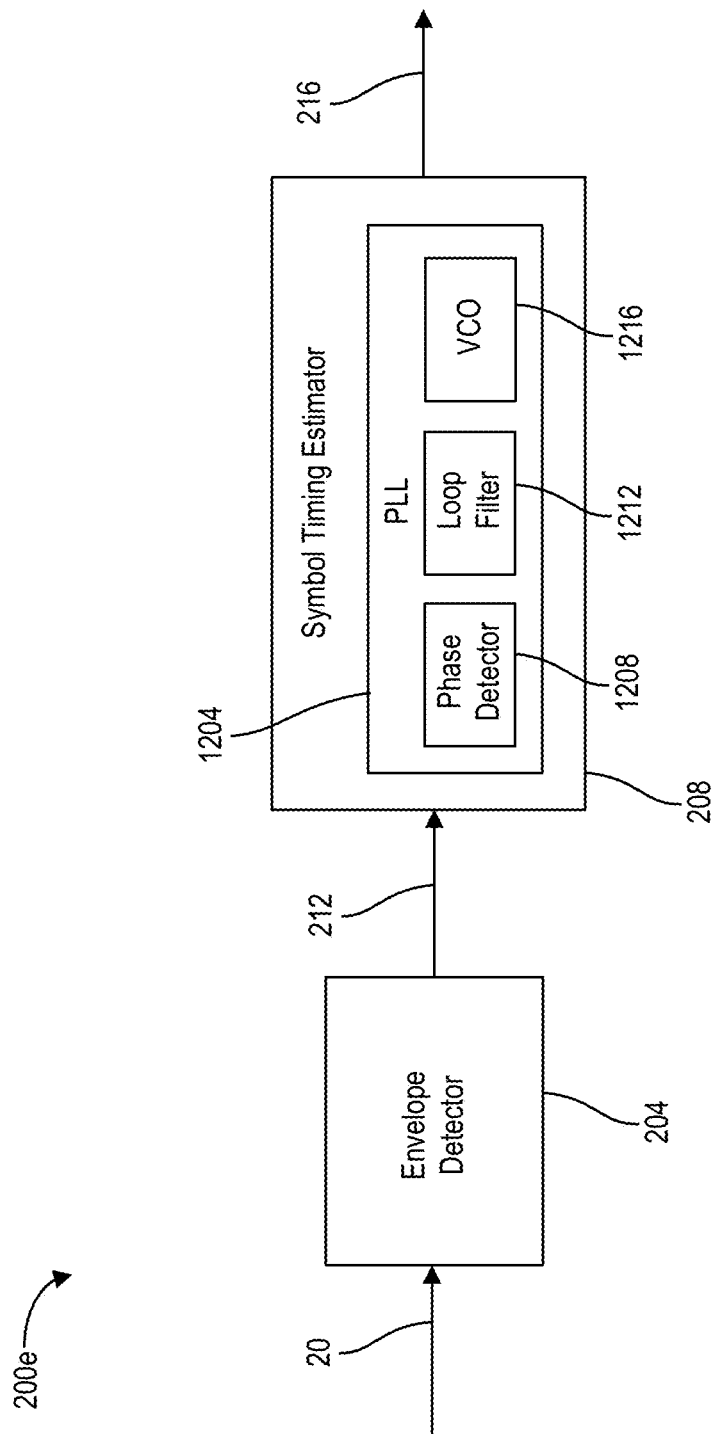
FIG. 12 is a block diagram of a circuit for estimating symbol timing in a received signal, in accordance with another example embodiment.

Reference is now made to FIG. 12, which is a block diagram of a circuit 200*e* for symbol timing estimation in received data frames 20. Circuit 200*e* includes envelope detector 204 and symbol timing estimator 208.

In the illustrated example embodiment, symbol timing estimator 208 includes a phase-locked loop (PLL) 1204 that is configured to receive the envelope detection output 212 from envelope detector 204. PLL 1204 can include a phase detector (PD) 1208, a loop filter 1212 and a voltage-controlled oscillator (VCO) 1216. PLL 1204 can function as a narrowband filter that isolates and extracts a suitable spectral peak signal from the envelope detection output 212 to generate a PLL output. PLL 1204 may be configured to lock onto any suitable spectral peak of the envelope detection output 212 (e.g., associated with the fundamental harmonic or higher order harmonics of the symbol frequency). Circuit 200e may directly provide the PLL output from PLL 1204 as symbol timing estimation output 216. Optionally, circuit 200e may further process the PLL output to generate the symbol timing estimation output 216.

Figure 13:
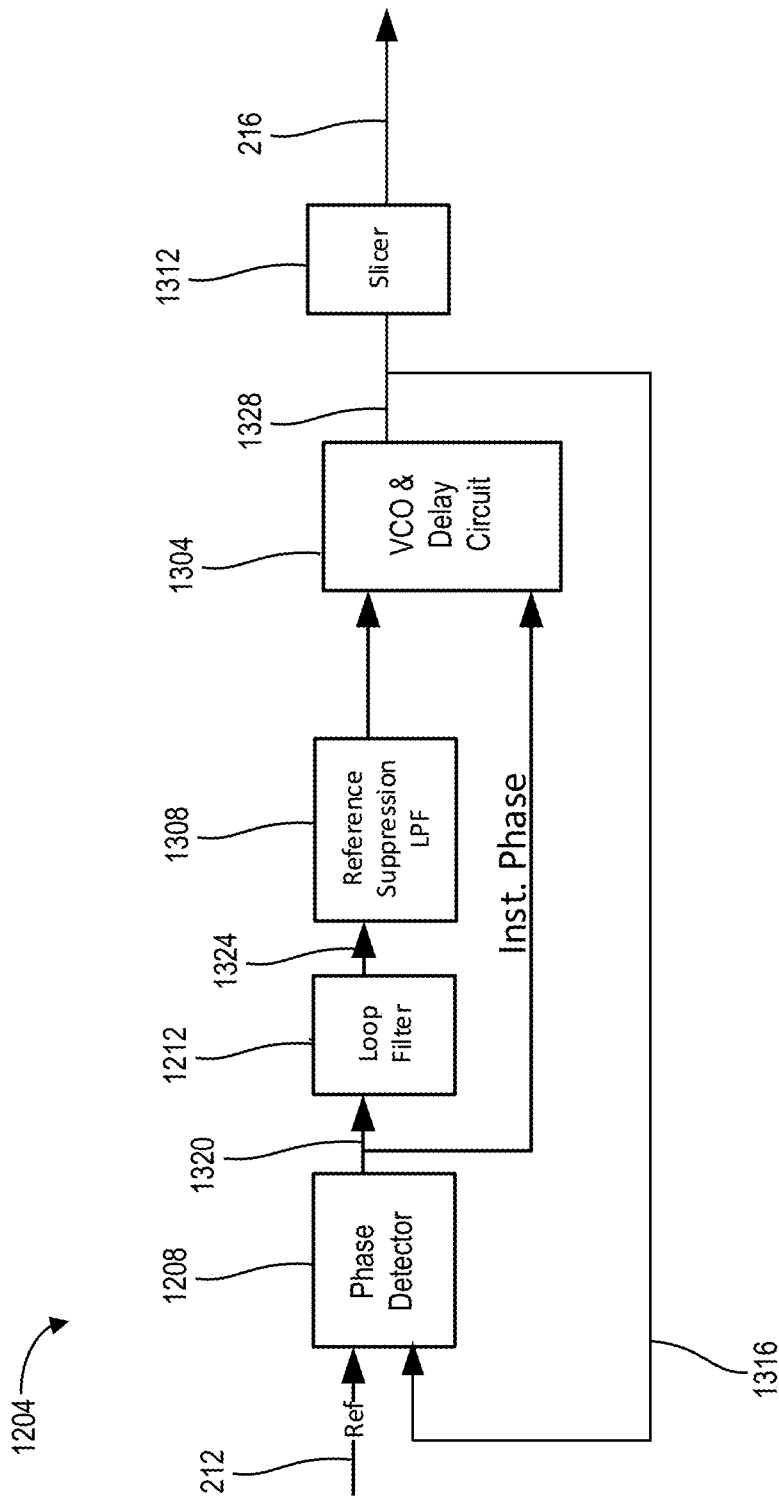
FIG. 13 is a block diagram of a phase locked loop of the circuit of FIG. 12, in accordance with an example embodiment.

Reference is now made to FIG. 13, which is a block diagram of an example embodiment of PLL 1204. In the illustrated example embodiment, PLL 1204 includes PD 1208, loop filter 1212 and a VCO and delay circuit 1304.

PD 1208 can generate a phase detector output 1320 that is proportional to the phase difference between a PLL reference input (e.g., envelope detection output 212) and a VCO and delay circuit output 1328. Any suitable design may be used for implementation of PD 1208. In some embodiments, PD 1208 may include a digital phase-frequency detector. In other embodiments, a different design may be used (e.g., a mixer/multiplier).

Loop filter 1212 may be configured to receive the phase detector output 1320 and generate a filtered signal 1324. Filtered signal 1324 may be used to apply a VCO control voltage to the VCO. Optionally, PLL 1204 may include a reference suppression low pass filter (LPF) 1308. Reference suppression LPF 1308 may further filter the signal 1324 before it is used to apply the VCO control voltage.

VCO and delay circuit 1304 may include any suitable voltage controlled oscillator (e.g., a sinusoidal VCO). The VCO may be designed with a center frequency corresponding to a target frequency of a spectral peak included in the envelope detection output 212. For example, the center frequency of the VCO may be equal to a fundamental harmonic of the reference symbol frequency or a higher order harmonic of the reference symbol frequency. In embodiments that include a VCO with a center frequency equal to a higher order harmonic of the reference symbol frequency, a frequency divider and phase resolver may be utilized, as described herein above with reference to FIGS. 9 to 11. PLL 1204 can operate to determine a VCO control voltage that matches/locks the frequency of the VCO with the frequency of the PLL reference signal (corresponding to the spectral peak target frequency).

In some embodiments, loop filter 1212 may be implemented as a selectable bandwidth loop filter. Reduction in bandwidth can improve the signal-to-noise performance of PLL 1204 but increase the amount of time required for PLL 1204 to achieve frequency locking/matching. A bandwidth gear shifting mechanism may be used to successively reduce the bandwidth of the PLL dynamically from an initial higher bandwidth value (enabling faster initial frequency lock) to a reduced bandwidth value (enabling higher signal-to-noise performance).

Figure 14:
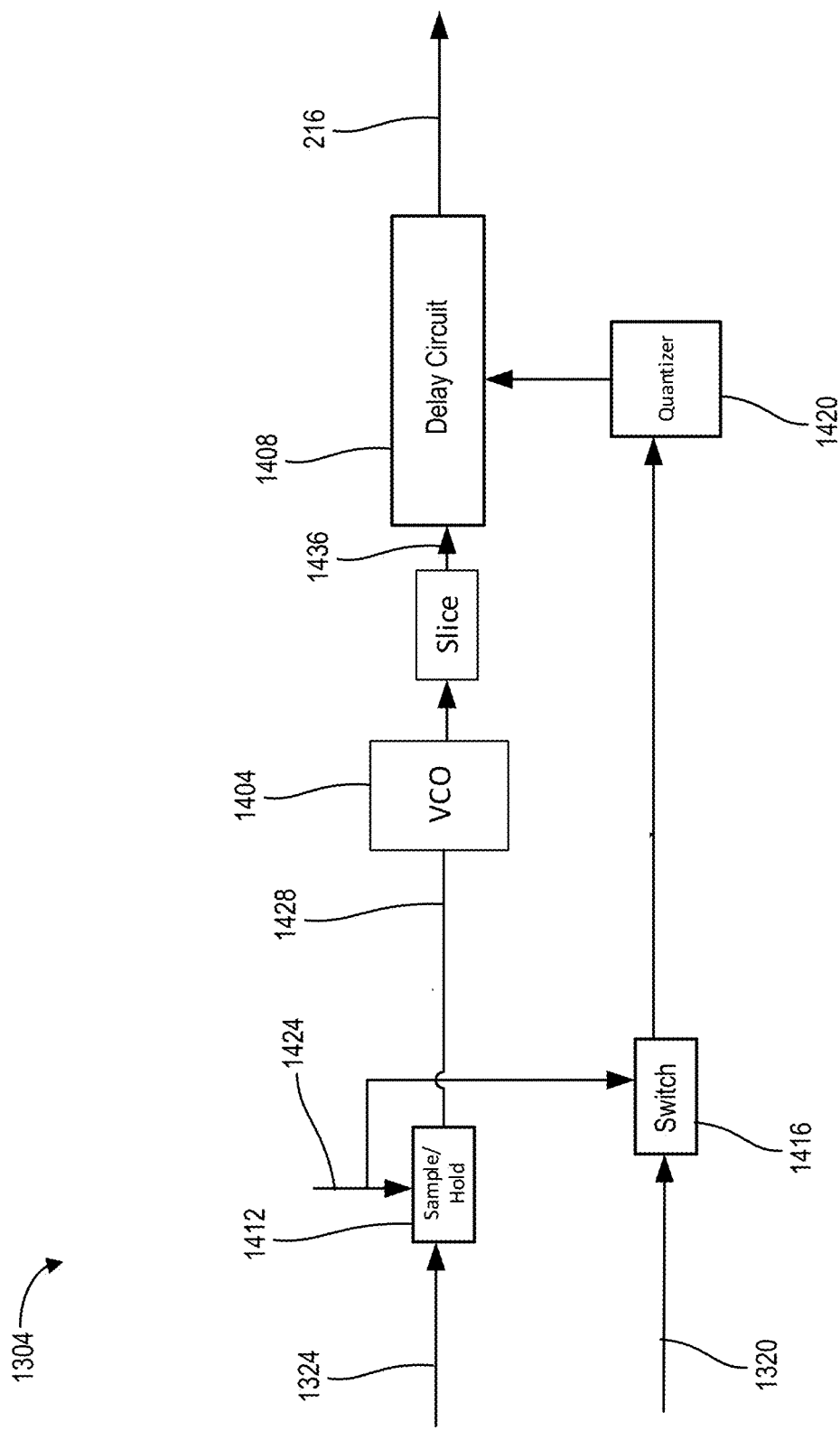
FIG. 14 is a block diagram of a voltage controlled oscillator and delay circuit of the phase locked loop of FIG. 13, in accordance with an example embodiment.

PLL 1204 may initially perform frequency acquisition to lock the frequency of the VCO with the frequency of the PLL reference signal. Subsequently, PLL 1204 may perform phase acquisition to match a phase of the frequency-locked VCO and delay circuit output 1328 with the phase of the PLL reference signal. Reference is now made to FIG. 14, which is a block diagram of an example embodiment of VCO and delay circuit 1304. In the illustrated example embodiment, VCO and delay circuit 1304 includes a VCO 1404, a delay circuit 1408, a sample/hold (S/H) block 1412, a switch 1416, and a quantizer 1420.

VCO 1404 may include any suitable voltage controlled oscillator, as described herein above with reference to FIG. 13. Delay circuit 1408 may have any suitable design to provide "n" delayed versions of VCO output 1436 and enable selection of any one of the n delayed versions. For example, delay circuit 1408 may include a n-tap delay line, with each tap corresponding to a (1/n*period of VCO output 1436) delay. Any suitable value of n may be used. In some embodiments, delay circuit 1408 may include a 50-tap delay line. In some embodiments, delay circuit 1408 may include greater than 50 taps. A larger number of delayed versions "n" can enable increased granularity of the phase matching. In some embodiments, delay circuit 1408 may include less than 50 taps. A smaller number of delayed versions "n" may reduce circuit cost/complexity. Any suitable design may be used to implement switch 1416. For example, switch 1416 may include a single-pole single-throw (SPST) switch.

A control input 1424 can control the frequency and phase acquisition operation of PLL 1204. For example, during an initial frequency acquisition operation of PLL 1204, the delay circuit may be set to any suitable delay value (e.g., a middle delay value). Further, control input 1424 may control the sample/hold (S/H) block 1412 to enable filtered signal 1324 from the loop filter to apply a VCO control voltage 1428 to VCO 1404. The VCO control voltage 1428 is determined during the initial frequency acquisition to match the frequency of VCO output 1436 with the frequency of the PLL reference signal (corresponding to the spectral peak target frequency).

After frequency acquisition is complete, control input 1424 may control the sample/hold (S/H) block 1412 to hold the VCO control voltage 1428 at the determined control voltage value (to maintain the frequency lock) while phase acquisition is performed. Control input 1424 may control the switch 1416 to apply the phase detector output 1320 to a quantizer 1420. The phase detector output 1320 can indicate the phase difference between the frequency-locked VCO output and the PLL reference signal. Quantizer 1420 may be configured to use the phase difference value to select a corresponding delayed version of the VCO output that most closely matches the phase of the PLL reference signal.

In some examples, the time required for frequency and phase acquisition, with a desired accuracy, can be less than the duration of a data frame. In such examples, PLL 1204 can perform frequency and phase acquisition for each received data frame. In other examples, the total time required for frequency and phase acquisition, with a desired accuracy, can be greater than the duration of a data frame. For example, a narrower bandwidth of the loop filter can enable higher accuracy frequency acquisition but requires a longer time duration to achieve frequency locking/matching. In such examples, the frequency acquisition may be performed for a first data frame and the phase acquisition for the frequency-locked output may be performed for a subsequent data frame.

Figure 15:
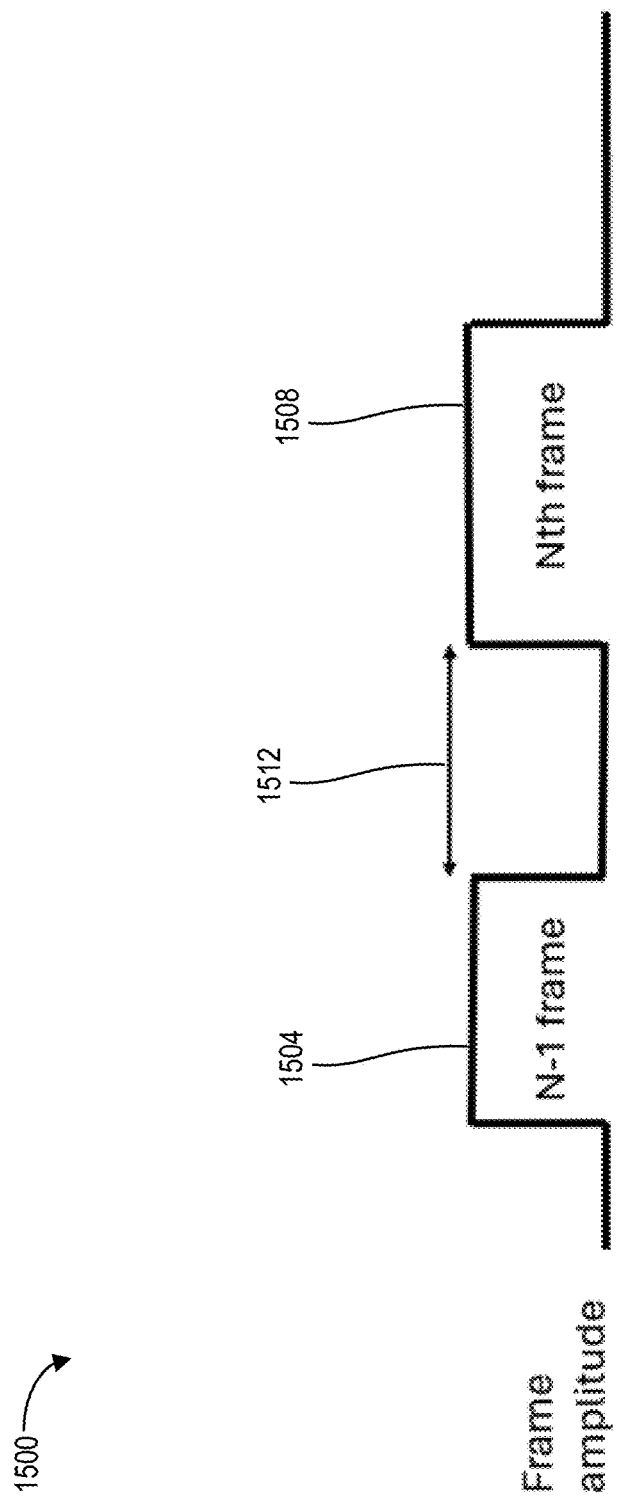
FIG. 15 is a timing diagram showing an example sequence of frames received at a backscattering tag of the backscatter communication system of FIG. 7.

Reference is now made to FIGS. 7 and 15. FIG. 15 is a timing diagram showing an example sequence of frames 1504 and 1508 received at backscattering tag 716. Transmitting unit 708 may transmit frames 1504 and 1508 ad-hoc using carrier sense multiple access (CSMA) without any centralized control, i.e., the interframe space (IFS) length 1512 can be random. Therefore, while the symbol frequency may be equal for frames 1504 and 1508, the symbol phase of frame 1508 may not have a predetermined/known relationship with reference to the symbol phase of frame 1504.

Circuit 200 can enable backscattering tag 716 to perform symbol frequency acquisition during frame 1504 (e.g., using PLL 1204 shown in FIGS. 12 and 13). Because symbol frequency is already acquired, circuit 200 may then only perform phase acquisition for frame 1508. For example, the VCO control voltage of PLL 1204 may be determined during frame 1504 to lock the frequency and the VCO control voltage may be held constant during IFS length 1512 and frame 1508 duration.

In some embodiments, backscattering tag 716 may be configured to encode backscattering tag data using symbols starting from the Kth symbol in the received data frame. Backscattering tag 716 can count/track the number of symbols for frame 1508 while phase acquisition is performed. High-accuracy phase determination may not be required for counting the number of symbols and therefore, backscattering tag 716 may track/count the number of symbols for frame 1508 while phase acquisition is performed. The phase acquisition may only be required to be completed before the start of the Kth symbol (that is modified and for which accurate symbol phase determination can improve backscattering performance, as described herein above).

For frame 1508, circuit 200 can enable fast phase acquisition for timely generation of the clock signal for encoding backscattering tag data (before the start of the Kth symbol in frame 1508). Circuit 200 can enable fast phase acquisition by—i) performing the frequency acquisition during frame 1504, and ii) during frame 1508, directly using the phase detector output (e.g., without passing through a loop filter) to select the closest phase-matched output from multiple delayed versions of the frequency-locked VCO output.

In some embodiments, the symbol timing estimator may include a combination of the bandpass filter and the PLL. For example, the bandpass filter may be used for an initial extraction of a desired spectral peak signal from the envelope detection output. The PLL may be applied to the bandpass filter output (e.g., to further improve the signal-to-noise ratio of the extracted signal) to generate the symbol timing estimation output.

Figure 16:
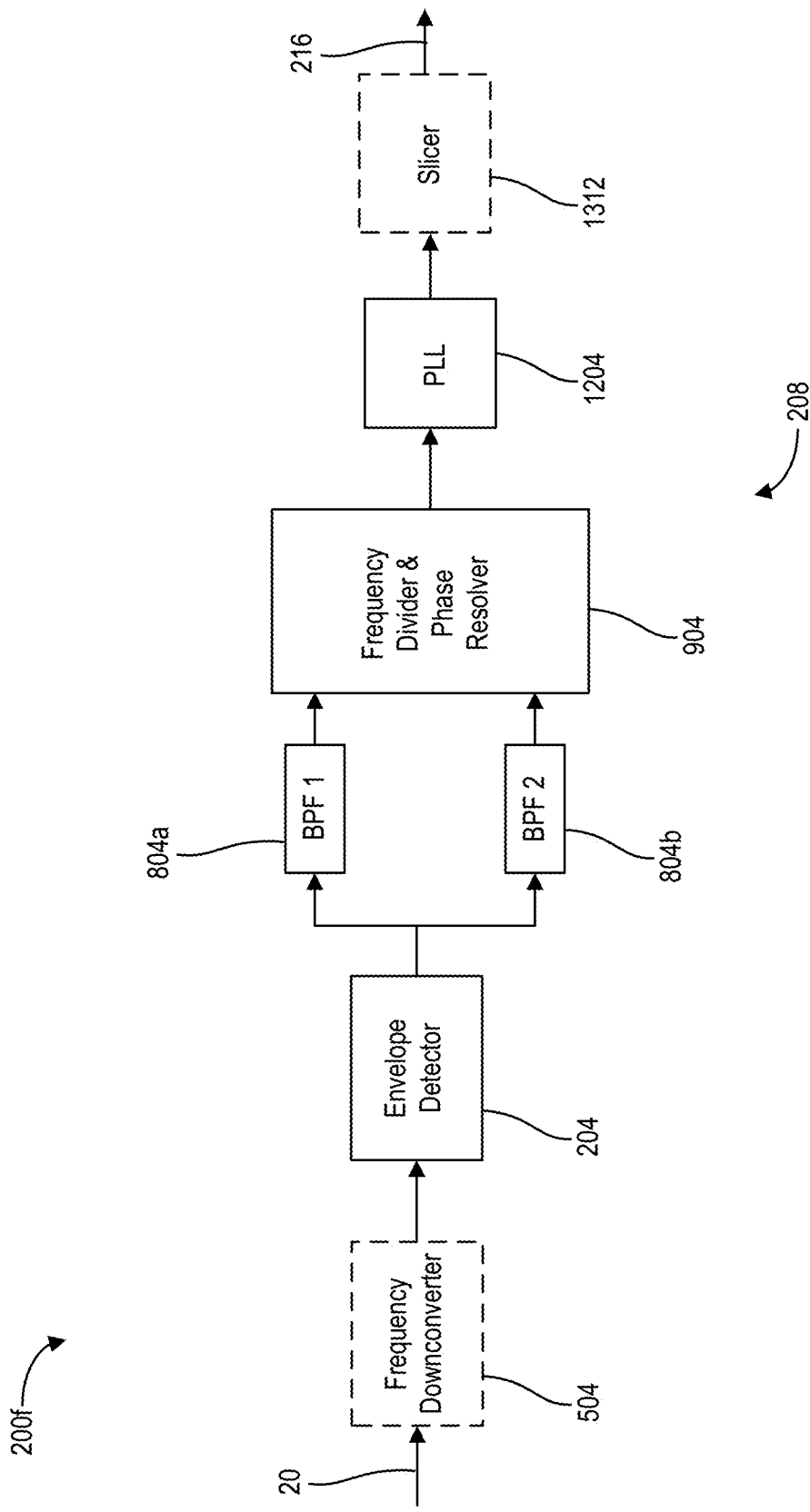
FIG. 16 is a block diagram of a circuit for estimating symbol timing in a received signal, in accordance with another example embodiment.

Reference is now made to FIG. 16, which is a block diagram of a circuit 200*f* for symbol timing estimation in received data frames 20. Circuit 200*f* includes envelope detector 204 and symbol timing estimator 208. In the illustrated example embodiment, symbol timing estimator 208 includes first bandpass filter 804*a*, second bandpass filter 804*b*, frequency divider and phase resolver 904, and PLL 1204.

Optionally, circuit 200*f* includes frequency downconverter 504. Frequency downconverter 504 can receive a signal including data frames 20 and generate a frequency down-converted output that is provided to envelope detector 204. In some embodiments, the frequency down-converted output from frequency downconverter 504 can include a real intermediate frequency signal. In some embodiments, the frequency down-converted output from frequency downconverter 504 can include a complex baseband I/Q (in-phase/quadrature) signal. If circuit 200*f* does not include frequency downconverter 504, the received data frames 20 may be input directly into envelope detector 204.

First bandpass filter 804*a* may have a center frequency equal to a reference symbol frequency $f_s$ ($1/T_s$). First bandpass filter 804*a* may be configured to receive the envelope detection output from envelope detector 204 and extract the spectral peak signal (from the envelope detection output) corresponding to the symbol frequency.

Second bandpass filter 804*b* may have a center frequency equal to a higher order harmonic of the reference symbol frequency $f_s$ ($1/T_s$). Second bandpass filter 804*b* may be configured to receive the envelope detection output from envelope detector 204 and extract the spectral peak signal corresponding to the higher order harmonic of the symbol frequency.

Frequency divider and phase resolver 904 may be configured to receive first bandpass filter output 908 and second bandpass filter output 912. Frequency divider and phase resolver 904 may be configured to divide the frequency of the second bandpass filter output to the fundamental harmonic of the symbol frequency and to resolve the phase ambiguity associated with the frequency division (by selecting the frequency divided output that has highest phase correlation with the first bandpass filter output).

The signal-to-noise ratio of the extracted signal may be further improved by applying the output of frequency divider and phase resolver 904 to PLL 1204. The VCO center frequency of PLL 1204 may be equal to a fundamental harmonic of the reference symbol frequency. PLL 1204 may be configured to perform frequency and phase acquisition, as described herein above, and generate symbol timing estimation output 216.

Optionally, circuit 200*f* may include a slicer 1312 for thresholding the PLL output to generate a square wave that can be used as a clock signal. If circuit 200*f* does not include a slicer 1312, the PLL output may be directly provided to an external circuit.

Figure 17:
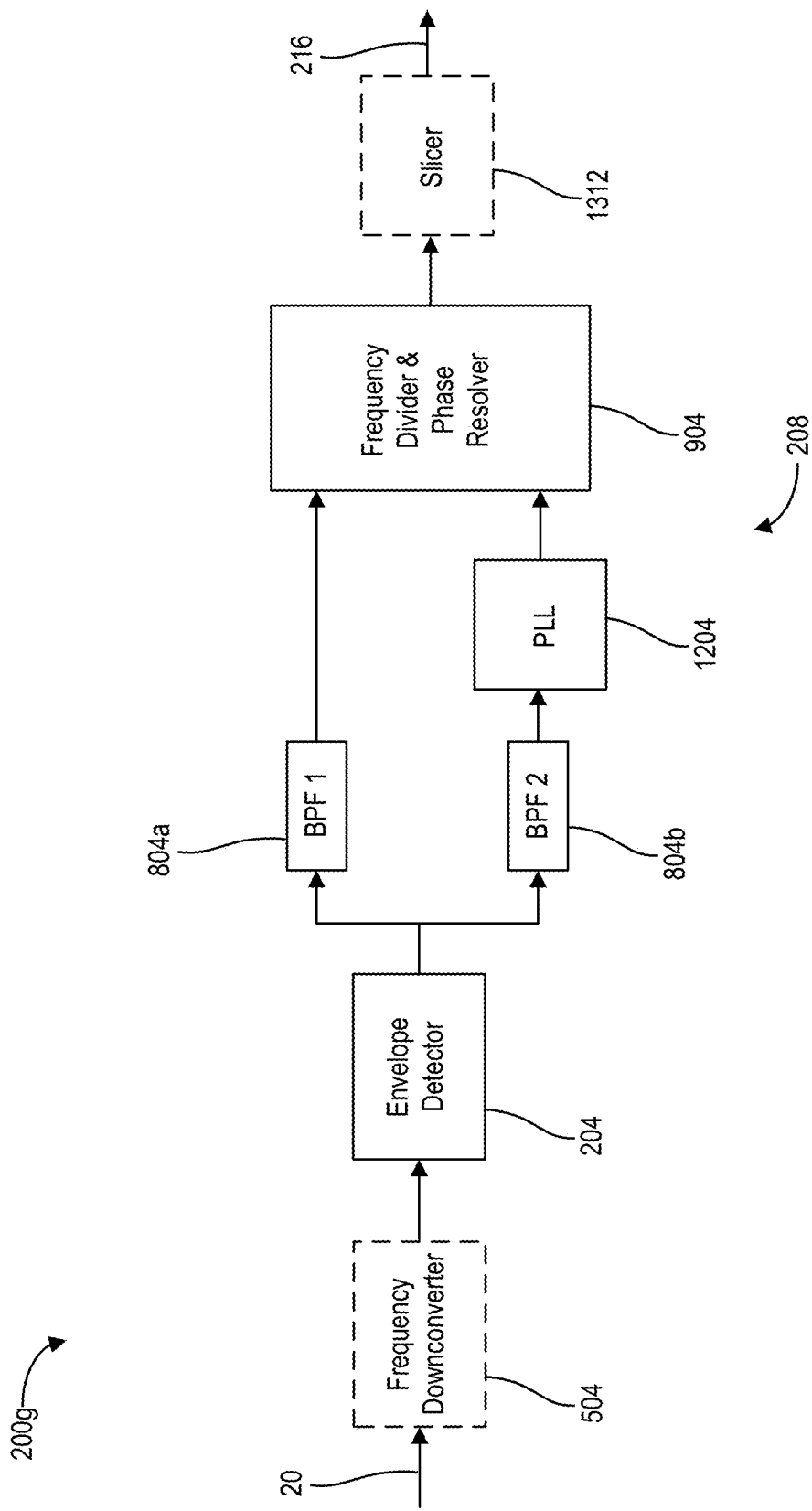
FIG. 17 is a block diagram of a circuit for estimating symbol timing in a received signal, in accordance with another example embodiment.

Reference is now made to FIG. 17, which is a block diagram of a circuit 200*g* for symbol timing estimation in received data frames 20. Circuit 200*g* includes envelope detector 204 and symbol timing estimator 208. In the illustrated example embodiment, symbol timing estimator 208 includes first bandpass filter 804*a*, second bandpass filter 804*b*, PLL 1204, and frequency divider and phase resolver 904.

Optionally, circuit 200*g* includes frequency downconverter 504. Frequency downconverter 504 can receive a signal including data frames 20 and generate a frequency down-converted output that is provided to envelope detector 204. If circuit 200*g* does not include frequency downconverter 504, the received data frames 20 may be input directly into envelope detector 204.

First bandpass filter 804*a* may have a center frequency equal to a reference symbol frequency $f_s$ ($1/T_s$). First bandpass filter 804*a* may be configured to receive the envelope detection output from envelope detector 204 and extract the spectral peak signal corresponding to the symbol frequency from the envelope detection output.

Second bandpass filter 804*b* may have a center frequency equal to a higher order harmonic of the reference symbol frequency $f_s$ ($1/T_s$). Second bandpass filter 804*b* may be configured to receive the envelope detection output from envelope detector 204 and extract the spectral peak signal corresponding to the higher order harmonic of the symbol frequency.

The signal-to-noise ratio of the extracted spectral peak included in the second bandpass filter output may be further improved by applying the output of second bandpass filter 804*b* to PLL 1204. The VCO center frequency of PLL 1204 may be equal to the center frequency of second bandpass filter 804*b* (higher order harmonic of the reference symbol frequency). PLL 1204 may effectively function as a narrower band filter compared with second bandpass filter 804*b* and thereby improve the signal-to-noise ratio of the extracted spectral peak signal.

Frequency divider and phase resolver 904 may be configured to receive the PLL output. Frequency divider and phase resolver 904 may be configured to divide the frequency of the PLL output to the fundamental harmonic of the symbol frequency and to resolve the phase ambiguity associated with the frequency division (by selecting the frequency divided output that has highest phase correlation with the first bandpass filter output).

Optionally, circuit 200g may include a slicer 1312 for thresholding the frequency divider and phase resolver output to generate a square wave that can be used as a clock signal. If circuit 200g does not include a slicer 1312, the output from frequency divider and phase resolver 904 may be directly provided to an external circuit.

Figure 18A:
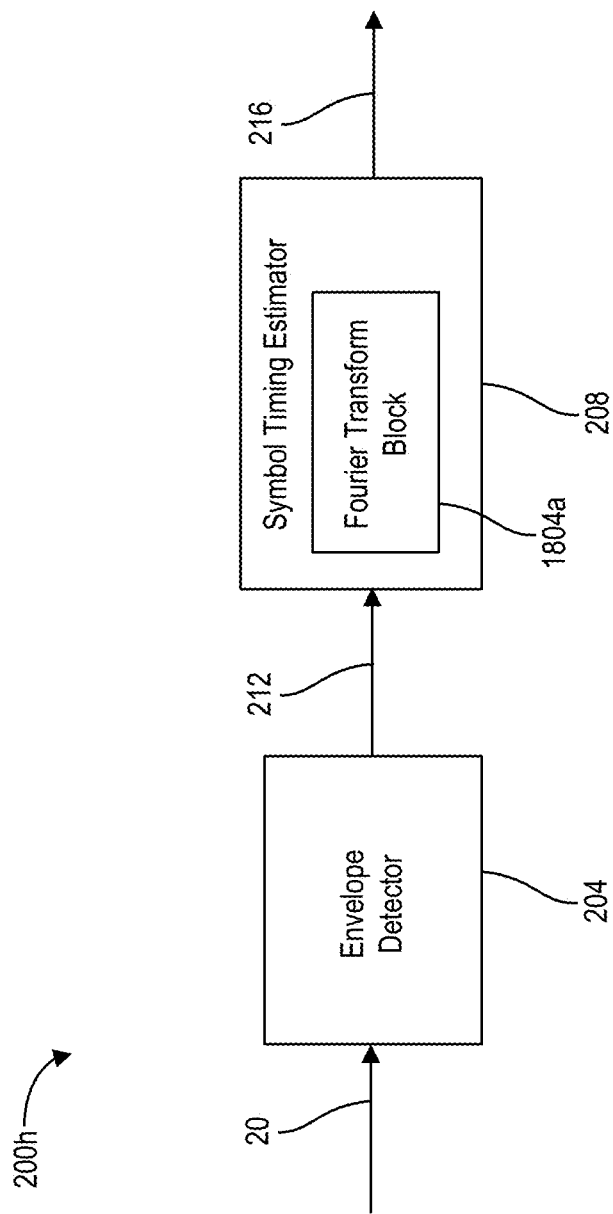
FIG. 18A is a block diagram of a circuit for estimating symbol timing in a received signal, in accordance with another example embodiment.

Reference is now made to FIG. 18A, which is a block diagram of a circuit 200h for symbol timing estimation in received data frames 20. Circuit 200h includes envelope detector 204 and symbol timing estimator 208.

In the illustrated example embodiment, envelope detector 204 directly receives data frames 20. In some embodiments, circuit 200h may further include a frequency downconverter 504. As described herein above, frequency downconverter 504 can generate a frequency down-converted output for the received signal and provide the frequency down-converted output (e.g., an IF or baseband frequency signal) to envelope detector 204. Optionally, frequency downconverter 504 may provide a filtered frequency down-converted output to envelope detector 204.

In the illustrated example embodiment, symbol timing estimator 208 includes a Fourier Transform block 1804a.

Fourier Transform block 1804a can enable symbol timing estimator 208 to extract symbol timing, frequency, and phase information by directly sampling envelope detection output 212. A Fourier Transform can be applied to envelope detection output 212 without requiring a bandpass filter or a PLL to first extract a target spectral peak signal from envelope detection output 212.

Figure 18B:
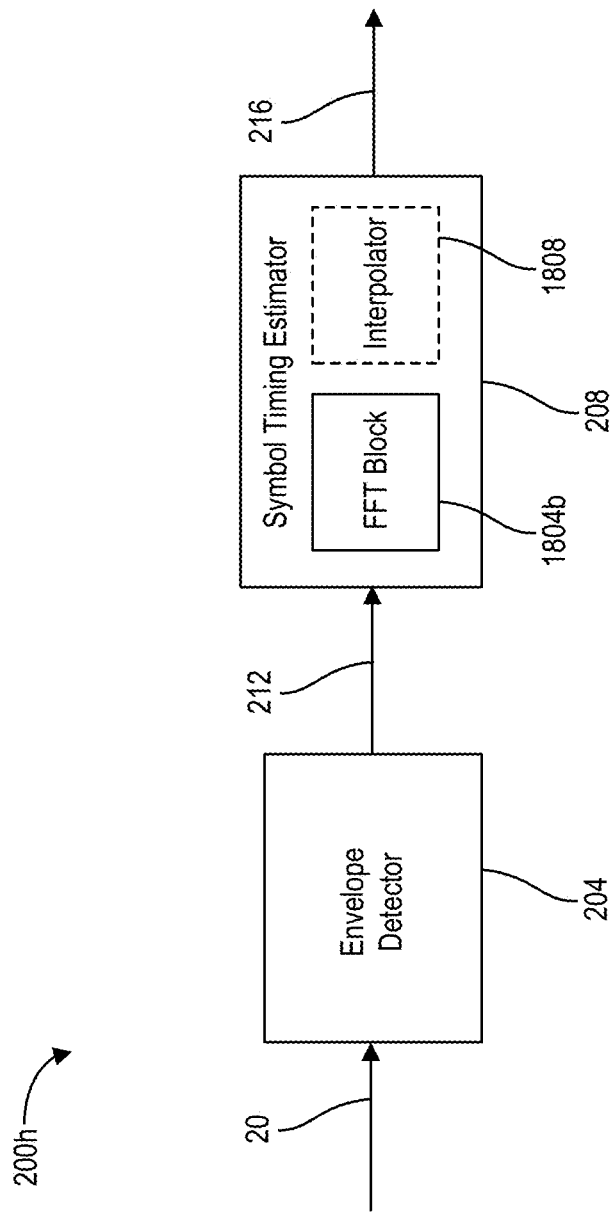
FIG. 18B is a block diagram of a circuit for estimating symbol timing in a received signal, in accordance with another example embodiment.

In some embodiments, Fourier Transform block 1804a may apply a Fast Fourier Transform (FFT) to envelope detection output 212. Reference is now made to FIG. 18B, which is a block diagram of a circuit 200h for symbol timing estimation in received data frames 20. In the illustrated example embodiment, symbol timing estimator 208 includes a FFT block 1804b.

FFT block 1804b may apply a FFT to envelope detection output 212. Optionally, symbol timing estimator 208 may further include an interpolator 1808. The FFT output is a complex representation of the frequency components of the envelope detection output. The complex outputs can be used to compute the amplitude, frequency and phase of any frequency component. Samples of the time domain signal applied to the input of the FFT can be represented as a sequence of discrete samples:

$$x[n]=x(0),x(1),x(2),\ldots,x(N-1)$$

where:
x[n] is the n-th discrete time sample of the time-domain signal.
N is the total number of samples.
x[n] can be real or complex.
The output of the FFT block is defined as:

$$X(k) = \sum_{n=0}^{N-1} x[n] e^{-j\frac{2\pi}{N}kn}, k = 0, 1, \ldots, N-1$$

where:
X[k] is the complex value for the k-th frequency bin,
j is the imaginary unit
k ranges from 0 to N−1.

Each X[k] represents a specific frequency component:
The magnitude |X[k]| gives the amplitude of the frequency component at bin k.
The angle arg(X[k]) gives the phase of that frequency component.
The phase (or angle) of X[k] will generate a phase output between $\pm\pi/2$ radians.
The phase $\theta$ is relative to the start of the FFT window time. Extraction of the exact time to start backscatter can be calculated from the phase of the 1 MHz frequency component or other frequency components of envelope detection output 212. The a tan 2 (b/a) function can be used to obtain angles covering $\pm\pi$ radians.

In some embodiments, the sampling rate of the FFT may be at least twice the Nyquist bandwidth of the signal to be analyzed. Higher sampling rates can provide greater resolution of amplitude and phase at the FFT output, but at a cost of increased complexity.

In some cases, the required frequency/phase resolution may be greater than the resolution that the FFT can provide. In some embodiments, symbol timing estimator 208 may include interpolator 1808 that can enable additional processing of adjacent FFT outputs by applying a fine interpolation algorithm. The interpolation algorithm may be designed to identify the peak magnitude of the frequency component and output the corresponding frequency and phase which can be used to provide a higher-accuracy phase and timing estimate compared with the output from FFT block 1804. In other embodiments, padding may be used with the FFT to locate the FFT magnitude peak with higher frequency resolution compared with the output from FFT block 1804.

Figure 18C:
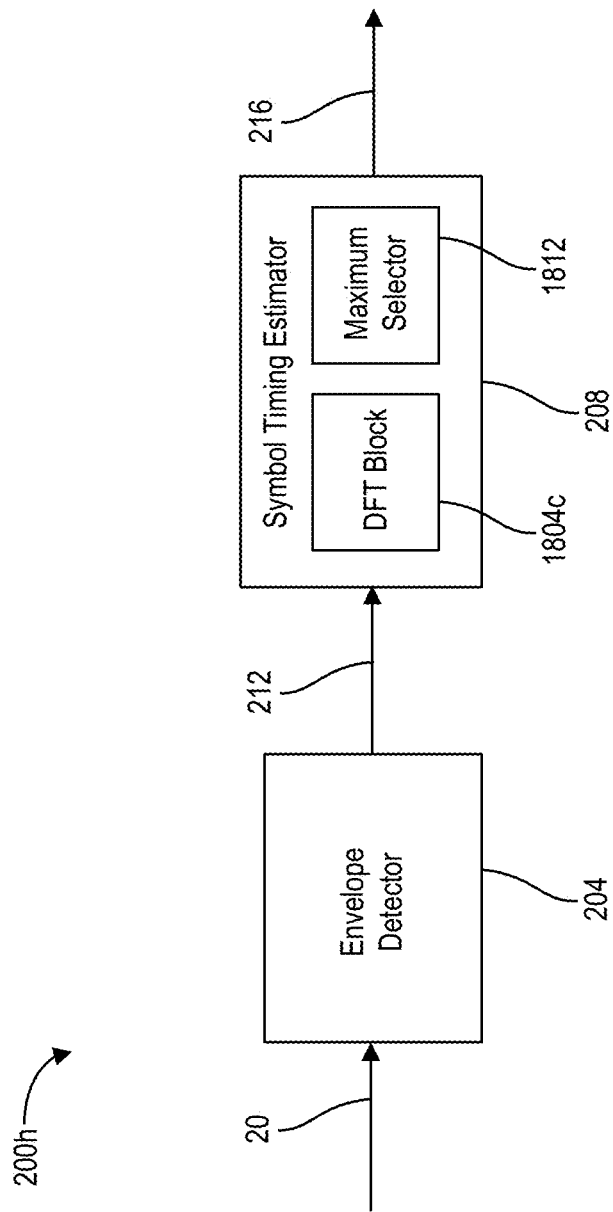
FIG. 18C is a block diagram of a circuit for estimating symbol timing in a received signal, in accordance with another example embodiment.

In some embodiments, Fourier Transform block 1804a of FIG. 18A may apply a Discrete Fourier Transform (DFT) to envelope detection output 212. Reference is now made to FIG. 18C, which is a block diagram of a circuit 200h for symbol timing estimation in received data frames 20. In the illustrated example embodiment, symbol timing estimator 208 includes a DFT block 1804c and a Maximum Selector 1812. DFT block 1804c may apply a DFT to envelope detection output 212.

A DFT can be used in place of the FFT to provide greater resolution of frequency and phase at a known frequency. For example, if a 1$^{st}$ harmonic from envelope detection output 212 is selected and filtered (e.g., using a BPF), then there may be no need to compute all the frequency components (e.g., as would be the case for a FFT). DFT block 1804c may apply the DFT to a captured time-domain signal and transform the samples x(n) into the frequency domain. The DFT can generate a set of complex values, where each value corresponds to a particular frequency bin, representing the amplitude and phase of the signal at that frequency. Maximum Selector 1812 may be used to select the frequency bin having the maximum amplitude.

$$X(k) = \sum_{n=0}^{N-1} x[n] e^{-j\frac{2\pi}{N}kn}, k = 0, 1, \ldots, N-1$$

where: X[k] is the DFT coefficient corresponding to frequency index k, N is the number of samples. The frequency bins $$e^{-j\frac{2\pi}{N}kn}$$

may be centered around a desired target frequency, for example, the 1$^{st}$ harmonic frequency.

Symbol timing estimation output 216 from block 1804/interpolator 1808/Maximum Selector 1812 may include amplitude, phase and frequency information about the time-domain signal from envelope detector 204. In some embodiments, this information can be used to generate a time stamp to synchronize backscattering of received data symbols, for example, as described herein with reference to act 1930 of method 1900.

Figure 19:
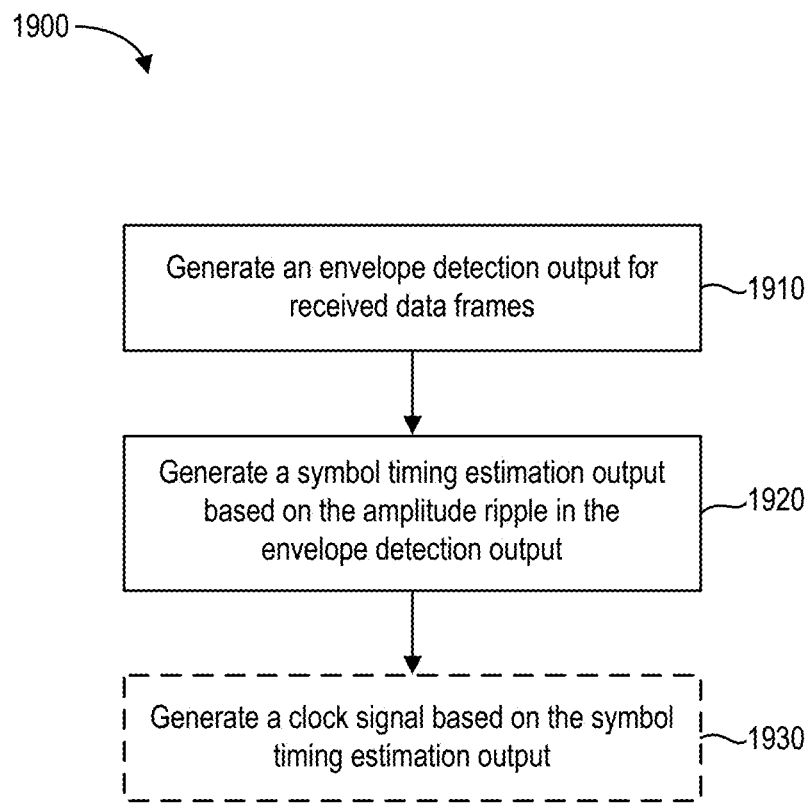
FIG. 19 is a process flow for an example embodiment of a method for estimating symbol timing in received data frames of a nominal constant envelope signal.

Reference is now made to FIG. 19, which is a process flow for an example embodiment of a method 1900 for estimating symbol timing in received data frames of a nominal constant envelope signal. The nominal constant envelope signal can be, for example, a filtered phase modulated signal.

Method 1900 may be performed, for example, by any of the circuits for estimating symbol timing described herein. For example, method 1900 may be performed by circuits 200a-200h shown in FIGS. 2, 5, 8, 9, 12, 16, 17, and 18 respectively and concurrent reference is made herein below to the components shown in FIGS. 2, 5, 8, 9, 12, 16, 17 and 18A-18C.

At act 1910 of method 1900, an envelope detector 204 generates an envelope detection output for one or more received data frames. The envelope detection output can have an amplitude ripple associated with the symbol timing in the received data frames.

At act 1920 of method 1900, a symbol timing estimator 208 generates a symbol timing estimation output based on the amplitude ripple in the envelope detection output. In some examples, the symbol timing estimation output may be generated based on a combination of received data frames. For example, circuit 200 may use a PLL for frequency acquisition during a first frame and subsequently use the locked frequency for phase acquisition during one or more subsequent frames.

In some example embodiments, method 1900 may include act 1930. At act 1930, a clock signal is generated based on the symbol timing estimation output. The clock signal may be generated, for example, by a backscattering tag (e.g., backscattering tag 716 shown in FIG. 7) to encode backscattering tag data onto a received data frame.

As an example, backscattering tag 716 may be configured to encode backscattering tag data using symbols starting from the Kth symbol in a received data frame. High-accuracy symbol timing estimation may not be required for the initial counting of symbols 1 to K−1 of the received data frame. Backscattering tag may use a local reference clock signal (for example, an on-board crystal oscillator clock signal that is divided down to be approximately the same frequency as the symbol frequency) for the initial counting of symbols 1 to K−1.

The exact relationship between the local reference clock signal frequency and phase with reference to the symbol timing frequency and phase may not be known. However, the time duration corresponding to counting the initial symbols (using the local reference clock) can provide symbol timing estimator 208 with sufficient time to generate the symbol timing estimation output. For example, as described herein above, this may provide sufficient time for the frequency and phase locking operation of a PLL to be completed. After the symbol timing estimation output is generated, backscattering tag 716 can switch over from using the local reference clock signal to the symbol timing estimation output that provides a higher-accuracy estimation of the symbol timing frequency and phase. This can enable high-accuracy synchronization of starting the backscattering with the start of the Kth symbol in the received data frame. In some embodiments, the time required for symbol timing estimator 208 to generate the high-accuracy symbol timing estimation output may be greater than the duration of symbols 1 to K−1. In such cases, backscattering tag may use an initial N−1 frame to begin symbol timing estimation and subsequently begin backscattering of the Nth frame (for example, as described herein above with reference to FIG. 15).

Symbol counting during the Nth frame can be initiated by the envelope detector output crossing a threshold indicating that the Nth frame has been received. Other methods, for example, may include the use of a Receive Signal Strength Indicator (RSSI) crossing a threshold.

Figure 20:
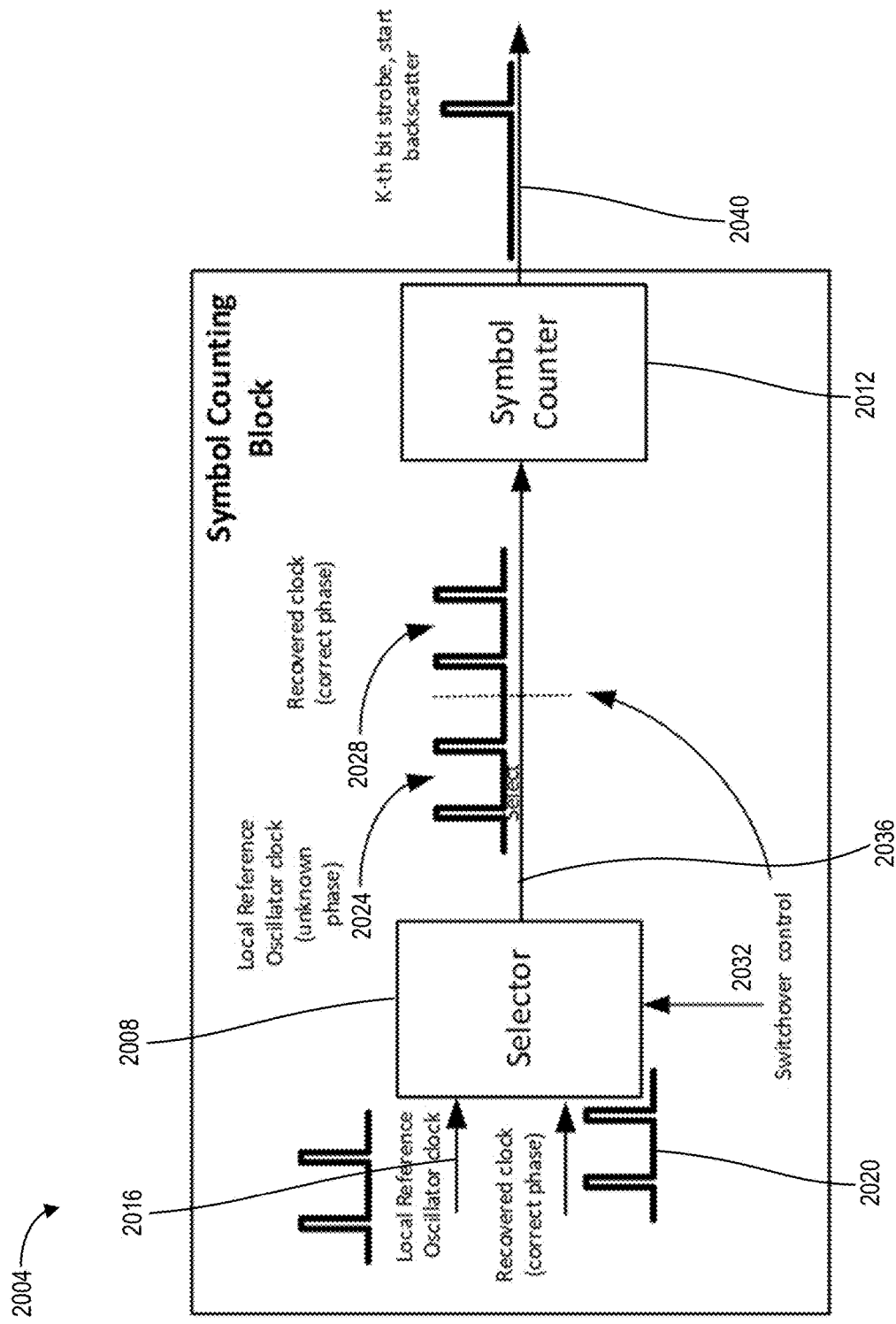
FIG. 20 is a block diagram of a symbol counting block of the backscattering tag of FIG. 7, in accordance with an example embodiment.

Reference is now additionally made to FIG. 20, which is a block diagram of an example symbol counting block 2004 of a backscattering tag. Symbol counting block 2004 may include a selector 2008 and a symbol counter 2012. An output 2036 of selector 2008 may be provided to symbol counter 2012. Selector 2008 may receive a switchover control signal 2032, a local reference clock signal 2016 and a recovered clock signal 2020.

Recovered clock signal 2020 may be received from symbol timing estimator 208 and provides high-accuracy symbol timing estimation. However, at the start of the Nth frame, recovered clock signal 2020 may not have sufficient accuracy, for example, due to filter rise times, and noise.

Switchover control signal 2032 can control which of the two input clock signals is provided at output 2036 of selector 2008. During an initial period 2024, selector 2008 may provide local reference clock signal 2016 at output 2036. During initial period 2024, local reference clock signal 2016 may provide a more stable clock signal compared with recovered clock signal 2020. An output 2040 of symbol counter 2012 may increment each time the local reference clock signal goes high.

In response to a sufficiently accurate recovered clock signal 2020 becoming available (at a time instance before the start of symbol K of a received data frame), switchover control signal 2032 may control selector 2008 to switch output 2036 from local reference clock signal 2016 to recovered clock signal 2020. After the switchover, symbol counter 2012 may continue counting symbols in the received data frame until the Kth symbol is reached and generate an output 2040 to indicate the start of the Kth symbol. Recovered clock signal 2020 can enable high-accuracy synchronization of the start of backscattering with the start of the Kth symbol in the received data frame. Output 2040 of symbol counter 2012 may include a strobe that is generated to indicate the exact time when the backscattering of the received data frame must start.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

We claim:

1. A circuit for estimating symbol timing in one or more received data frames of a nominal constant envelope signal, the circuit comprising:
    an envelope detector configured to generate an envelope detection output for the received data frames, the envelope detection output having an amplitude ripple associated with the symbol timing in the received data frames; and
    a symbol timing estimator configured to receive the envelope detection output and generate a symbol timing estimation output based on the amplitude ripple.

2. The circuit of claim 1, wherein the circuit is included in a backscattering tag configured to:
    generate a clock signal based on the symbol timing estimation output; and
    use the clock signal during backscattering of the received data frames.

3. The circuit of claim 2, wherein the backscattering tag is configured to begin the backscattering at a Kth symbol of at least one received data frame and the backscattering tag includes a symbol counting block configured to generate a symbol counting block output to:
    count occurrence of symbols 1 to K−1 in the at least one received data frame; and
    indicate start of the Kth symbol in the at least one received data frame.

4. The circuit of claim 3, wherein the symbol counting block comprises:
    a selector configured to generate a selector output to select between a local reference clock signal and a recovered clock signal based on an input switchover control signal; and
    a symbol counter configured to receive the selector output and generate the symbol counting block output.

5. The circuit of claim 1, wherein the symbol timing estimator comprises a bandpass filter configured to receive the envelope detection output.

6. The circuit of claim 5, wherein the center frequency of the bandpass filter is equal to a reference symbol frequency of the received data frames.

7. The circuit of claim 5, wherein the center frequency of the bandpass filter is equal to a harmonic of the reference symbol frequency of the received data frames.

8. The circuit of claim 1 further comprising a frequency down-converter configured to generate a frequency down-converted output for the nominal constant envelope signal and provide the frequency down-converted output to the envelope detector to generate the envelope detection output.

9. The circuit of claim 8, wherein the frequency down-converted output includes a real intermediate frequency signal or a complex baseband I/Q (in-phase/quadrature) signal.

10. The circuit of claim 1, wherein the symbol timing estimator comprises a phase-locked loop (PLL) configured to receive the envelope detection output, the PLL including a phase detector, a loop filter and a voltage-controlled oscillator (VCO).

11. The circuit of claim 10, wherein the symbol timing estimator further comprises a bandpass filter configured to receive the envelope detection output, and the PLL is configured to receive a bandpass filter output from the bandpass filter.

12. The circuit of claim 10, wherein a VCO control voltage is determined for a first frame of the received data frames to lock a PLL frequency to a target frequency of the envelope detection output and the determined VCO control voltage is applied to the VCO during one or more subsequent frames to maintain the PLL frequency locked to the target frequency.

13. The circuit of claim 10, wherein the PLL further includes a delay circuit configured to provide multiple delayed versions of a VCO output.

14. The circuit of claim 13, wherein the PLL is further configured to use a phase detector output to select one of the multiple delayed versions of the VCO output, the selected version of the VCO output providing the closest phase matching to the symbol timing.

15. The circuit of claim 1, wherein the symbol timing estimator comprises:
    a first bandpass filter configured to receive the envelope detection output, the first bandpass filter having a center frequency equal to a reference symbol frequency of the received data frames;
    a second bandpass filter configured to receive the envelope detection output, the second bandpass filter having a center frequency equal to a higher order harmonic of the reference symbol frequency of the received data frames;
    a frequency divider configured to generate multiple frequency divided outputs based on output from the second bandpass filter, each of the multiple frequency divided outputs having an identical frequency equal to a symbol frequency detected in the output from the second bandpass filter, and a different phase compared with other frequency divided outputs; and
    a phase resolver configured to generate the symbol timing estimation output by selecting the frequency divided output having highest phase correlation with output from the first bandpass filter.

16. The circuit of claim 1, wherein the symbol timing estimator comprises:
    a first bandpass filter configured to receive the envelope detection output, the first bandpass filter having a center frequency equal to a reference symbol frequency of the received data frames;
    a second bandpass filter configured to receive the envelope detection output, the second bandpass filter having a center frequency equal to a higher order harmonic of the reference symbol frequency of the received data frames;
    a PLL configured to receive output from the second bandpass filter, a VCO center frequency of the PLL being equal to the higher order harmonic of the reference symbol frequency;
    a frequency divider configured to generate multiple frequency divided outputs based on output from the PLL, each of the multiple frequency divided outputs having an identical frequency equal to a symbol frequency detected in the output from the PLL, and a different phase compared with other frequency divided outputs; and
    a phase resolver configured to generate the symbol timing estimation output by selecting the frequency divided output having highest phase correlation with output from the first bandpass filter.

17. The circuit of claim 1, wherein the symbol timing estimator comprises a Fast Fourier Transform (FFT) block or a Discrete Fourier Transform (DFT) block configured to receive the envelope detection output and generate a complex frequency domain output to extract an amplitude, a frequency and a phase of one or more frequency components having the largest amplitudes.

18. The circuit of claim 17, wherein the symbol timing estimator further comprises an additional processing block configured to receive the complex frequency domain output and extract timing information from the amplitude, the frequency and/or the phase of the one or more frequency components having the largest amplitudes.

19. The circuit of claim 18, wherein the additional processing block is an interpolation block configured to identify a maximum peak amplitude among the one or more frequency components having the largest amplitudes.

20. The circuit of claim 1, wherein the nominal constant envelope signal is a filtered phase modulated signal.

21. The circuit of claim 3, wherein the backscattering tag is further configured to identify a start of the received data frame in response to the envelope detection output meeting a threshold condition.

22. A method for estimating symbol timing in one or more received data frames of a nominal constant envelope signal, the method comprising:
  generating an envelope detection output for the received data frames, the envelope detection output having an amplitude ripple associated with the symbol timing in the received data frames; and
  generating a symbol timing estimation output based on the amplitude ripple in the envelope detection output.

23. The method of claim 22 further comprising:
  generating, by a backscattering tag, a clock signal based on the symbol timing estimation output; and
  using the clock signal to encode backscattering tag data during backscattering of the received data frames.

24. The method of claim 22, wherein generating the symbol timing estimation output comprises using a bandpass filter to filter the envelope detection output, wherein a center frequency of the bandpass filter is equal to i) a reference symbol frequency of the received data frames, or ii) a harmonic of the reference symbol frequency of the received data frames.

25. The method of claim 22 further comprising:
  generating a frequency down-converted output for the nominal constant envelope signal; and
  providing the frequency down-converted output to the envelope detector to generate the envelope detection output.

26. The method of claim 22, wherein generating the symbol timing estimation output comprises applying the envelope detection output to a phase locked loop (PLL).

27. The method of claim 26, wherein generating the symbol timing estimation output comprises:
  determining a voltage-controlled oscillator (VCO) control voltage for a first frame of the received data frames to lock a PLL frequency to a target frequency of the envelope detection output; and
  holding the determined VCO control voltage constant during one or more subsequent frames to maintain the PLL frequency locked to the target frequency.

* * * * *